US012092985B2

(12) United States Patent
Yuasa et al.

(10) Patent No.: US 12,092,985 B2
(45) Date of Patent: Sep. 17, 2024

(54) IMAGE FORMING APPARATUS

(71) Applicant: CANON KABUSHIKI KAISHA, Tokyo (JP)

(72) Inventors: Takao Yuasa, Chiba (JP); Ryo Nameki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/318,886

(22) Filed: May 17, 2023

(65) Prior Publication Data

US 2023/0418206 A1 Dec. 28, 2023

(30) Foreign Application Priority Data

Jun. 24, 2022 (JP) ................................ 2022-102279

(51) Int. Cl.
*G03G 21/00* (2006.01)

(52) U.S. Cl.
CPC ..... *G03G 21/0017* (2013.01); *G03G 21/0011* (2013.01)

(58) Field of Classification Search
CPC ....................... G03G 21/0011; G03G 21/0017
See application file for complete search history.

(56) References Cited

U.S. PATENT DOCUMENTS 7,630,678 B2 12/2009 Kishi et al.
7,729,638 B2 6/2010 Katahira et al.
7,773,934 B2 8/2010 Kishi et al.
2003/0108360 A1* 6/2003 Ogasawara ........ G03G 21/0011 399/350
2008/0181666 A1* 7/2008 Katahira ............ G03G 15/0233 399/350
2013/0236208 A1* 9/2013 Komatsu ............ G03G 21/0017 399/101

FOREIGN PATENT DOCUMENTS

JP 2006-259394 A 9/2006
JP 2008-185720 A 8/2008
JP 2009-42581 A 2/2009
JP 2010-102027 A 5/2010
JP 2013-125199 A 6/2013

* cited by examiner

*Primary Examiner* — Sandra Brase
(74) *Attorney, Agent, or Firm* — Venable LLP

(57) ABSTRACT

An image forming apparatus includes an image bearing member, a developer carrying member, and a cleaning member including an elastic blade and a regulating portion. When an average of a free length L1 [mm] of the elastic blade in the image bearing region in the widthwise direction of the elastic blade is an average free length L1*a* [mm], an average of a free length L2 [mm] of the elastic blade on an outside of the developing region in the widthwise direction of the elastic blade is an average free length L2*a* [mm], and an absolute value of a difference between the average free length L1*a* and the average free length L2*a* is a free length difference ΔL [mm], the following relationships are satisfied:

$$L2a \geq 1.2 \times L1a,$$

$$L2 \geq L2a - \Delta L \times 0.2, \text{ and}$$

$$L1 \leq L1a + \Delta L \times 0.2.$$

15 Claims, 23 Drawing Sheets

(a)
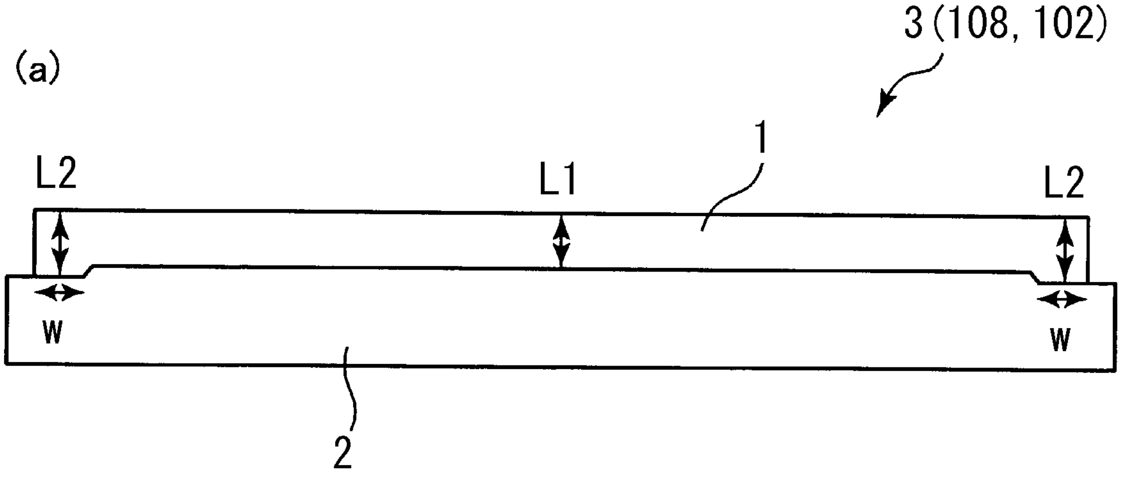
(b)
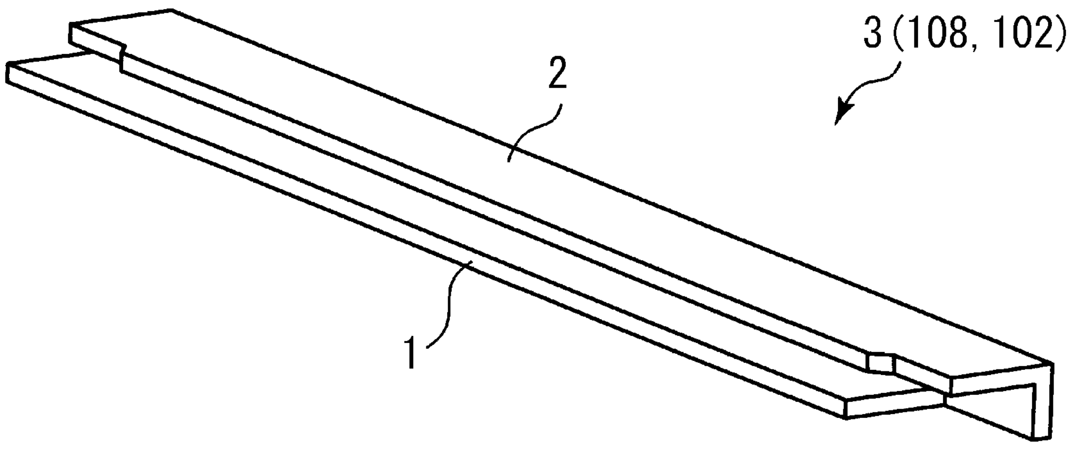
Fig. 5

(a)

OCCURRENCE STATUS OF TURNING-UP OF BLADE FOR EACH NUMBER OF SHEETS

| WIDTH w | NUMBER OF SHEETS SUBJECTED TO SHEET PASSING (SHEETS) | | | | |
|---|---|---|---|---|---|
| | 5000 | 10000 | 15000 | 20000 | 25000 |
| 0mm | ○ | ○ | × | – | – |
| 2mm | ○ | ○ | ○ | × | – |
| 4mm | ○ | ○ | ○ | ○ | × |
| 6mm | ○ | ○ | ○ | ○ | ○ |
| 8mm | ○ | ○ | ○ | ○ | ○ |
| 10mm | ○ | ○ | ○ | ○ | ○ |

○ : NOT OCCURRED
× : OCCURRED (b)

OCCURRENCE STATUS OF IMPROPER CLEANING

| WIDTH w | | | | | |
|---|---|---|---|---|---|
| 0mm | 2mm | 4mm | 6mm | 8mm | 10mm |
| ○ | ○ | ○ | ○ | △ | × |

○ : NOT OCCURRED
△ : OCCURRED (SLIGHT)
× : OCCURRED

Fig. 8

(a)

OCCURRENCE STATUS OF TURNING-UP OF BLADE FOR EACH NUMBER OF SHEETS

| WIDTH w | NUMBER OF SHEETS SUBJECTED TO SHEET PASSING (SHEETS) | | | | |
|---|---|---|---|---|---|
| | 5000 | 10000 | 15000 | 20000 | 25000 |
| 0mm | ○ | × | – | – | – |
| 2mm | ○ | ○ | × | – | – |
| 4mm | ○ | ○ | ○ | × | – |
| 6mm | ○ | ○ | ○ | ○ | × |
| 8mm | ○ | ○ | ○ | ○ | ○ |
| 10mm | ○ | ○ | ○ | ○ | ○ |

○ : NOT OCCURRED
× : OCCURRED (b)

OCCURRENCE STATUS OF IMPROPER CLEANING

| WIDTH w | | | | | |
|---|---|---|---|---|---|
| 0mm | 2mm | 4mm | 6mm | 8mm | 10mm |
| ○ | ○ | ○ | ○ | ○ | △ |

○ : NOT OCCURRED
△ : OCCURRED (SLIGHT)
× : OCCURRED

Fig. 9

OCCURRENCE STATUS OF TURNING-UP OF BLADE FOR EACH NUMBER OF SHEETS

| | NUMBER OF SHEETS SUBJECTED TO SHEET PASSING (SHEETS) | | | | |
|---|---|---|---|---|---|
| | 5000 | 10000 | 15000 | 20000 | 25000 |
| 0mm | × | – | – | – | – |
| 2mm | × | – | – | – | – |
| 4mm | ○ | × | – | – | – |
| 6mm | ○ | ○ | × | – | – |
| 8mm | ○ | ○ | ○ | × | – |
| 10mm | ○ | ○ | ○ | ○ | × |

○ : NOT OCCURRED
× : OCCURRED

Fig. 10

(a)

TEST RESULT OF TURNING-UP OF BLADE

| | | L1 max | | | | |
|---|---|---|---|---|---|---|
| | | 1.00×L1a | 1.02×L1a | 1.04×L1a | 1.06×L1a | 1.08×L1a |
| L2 min | 1.10×L1a | × | × | × | × | × |
| | 1.12×L1a | × | × | × | × | × |
| | 1.14×L1a | × | × | × | × | × |
| | 1.16×L1a | ○ | ○ | ○ | ○ | ○ |
| | 1.18×L1a | ○ | ○ | ○ | ○ | ○ |
| | 1.20×L1a | ○ | ○ | ○ | ○ | ○ |

○:NOT OCCURRED
×:OCCURRED (b)

TEST RESULT OF PASSING-THROUGH

| | | L1 max | | | | |
|---|---|---|---|---|---|---|
| | | 1.00×L1a | 1.02×L1a | 1.04×L1a | 1.06×L1a | 1.08×L1a |
| L2 min | 1.10×L1a | ○ | ○ | ○ | × | × |
| | 1.12×L1a | ○ | ○ | ○ | × | × |
| | 1.14×L1a | ○ | ○ | ○ | × | × |
| | 1.16×L1a | ○ | ○ | ○ | × | × |
| | 1.18×L1a | ○ | ○ | ○ | × | × |
| | 1.20×L1a | ○ | ○ | ○ | × | × |
| L2 max | 1.46×L1a | ○ | ○ | ○ | × | × |
| | 1.48×L1a | × | × | × | × | × |

○:NOT OCCURRED
×:OCCURRED

Fig. 12

(a)
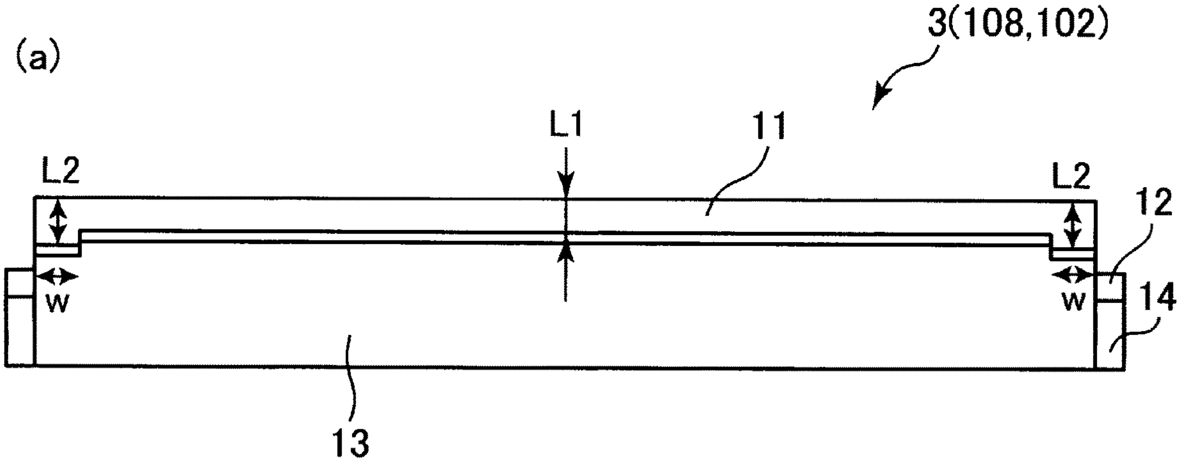
(b)
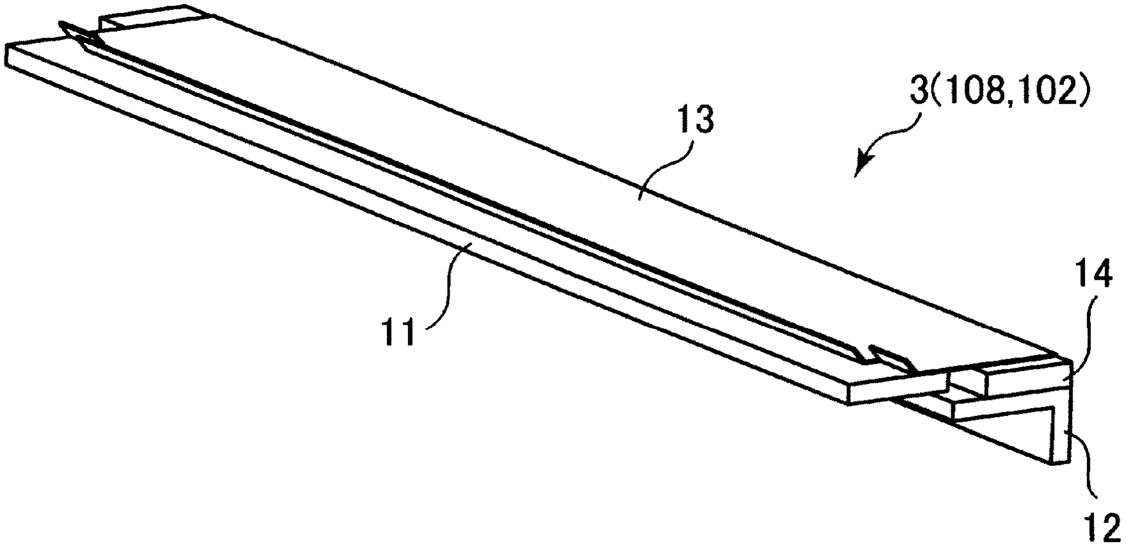
Fig. 13

(a) OCCURRENCE STATUS OF TURNING-UP OF BLADE FOR EACH NUMBER OF SHEETS

| | | CURING TREATMENT WIDTH w4 | | | | | |
|---|---|---|---|---|---|---|---|
| | | 0mm | 2mm | 4mm | 6mm | 8mm | 10mm |
| WIDTH w | 0mm | 7500SH × | 14000SH × | ○ | ○ | ○ | ○ |
| | 2mm | 13500SH × | 18000SH × | ○ | ○ | ○ | ○ |
| | 4mm | 18000SH × | ○ | ○ | ○ | ○ | ○ |
| | 6mm | 24000SH × | ○ | ○ | ○ | ○ | ○ |
| | 8mm | ○ | ○ | ○ | ○ | ○ | ○ |
| | 10mm | ○ | ○ | ○ | ○ | ○ | ○ |

○ : NOT OCCURRED
× : OCCURRED (b) OCCURRENCE STATUS OF IMPROPER CLEANING

| | | CURING TREATMENT WIDTH w4 | | | | | |
|---|---|---|---|---|---|---|---|
| | | 0mm | 2mm | 4mm | 6mm | 8mm | 10mm |
| WIDTH w | 0mm | ○ | ○ | ○ | ○ | △ | △ |
| | 2mm | ○ | ○ | ○ | ○ | △ | △ |
| | 4mm | ○ | ○ | ○ | ○ | △ | △ |
| | 6mm | ○ | ○ | ○ | ○ | △ | △ |
| | 8mm | △ | △ | △ | △ | △ | △ |
| | 10mm | × | × | × | × | × | × |

○ : NOT OCCURRED
△ : OCCURRED (SLIGHT)
× : OCCURRED (c) OCCURRENCE STATUS OF LOCAL ABRASION

| | | CURING TREATMENT WIDTH w4 | | | | | |
|---|---|---|---|---|---|---|---|
| | | 0mm | 2mm | 4mm | 6mm | 8mm | 10mm |
| WIDTH w | 0mm | ○ | ○ | × | × | × | × |
| | 2mm | ○ | ○ | × | × | × | × |
| | 4mm | ○ | ○ | × | × | × | × |
| | 6mm | ○ | ○ | ○ | × | × | × |
| | 8mm | ○ | ○ | ○ | × | × | × |
| | 10mm | ○ | ○ | ○ | × | × | × |

○ : NOT OCCURRED
× : OCCURRED

Fig. 16

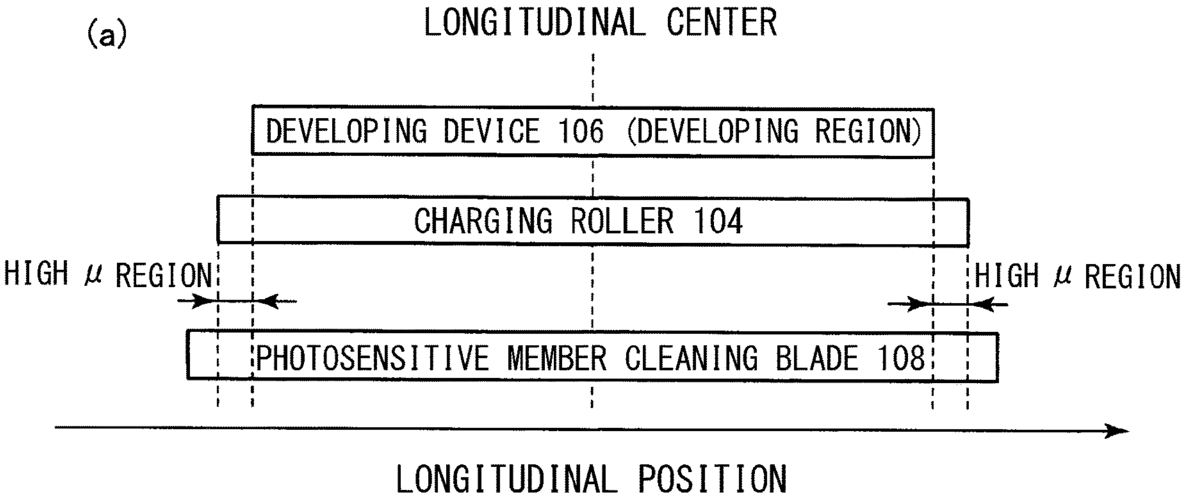
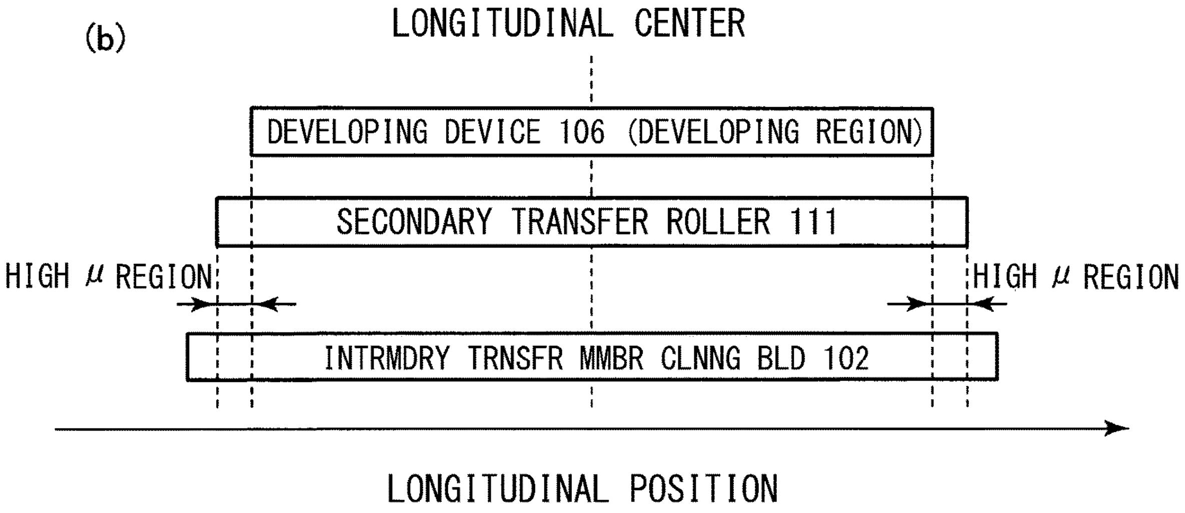
Fig. 17

(a)
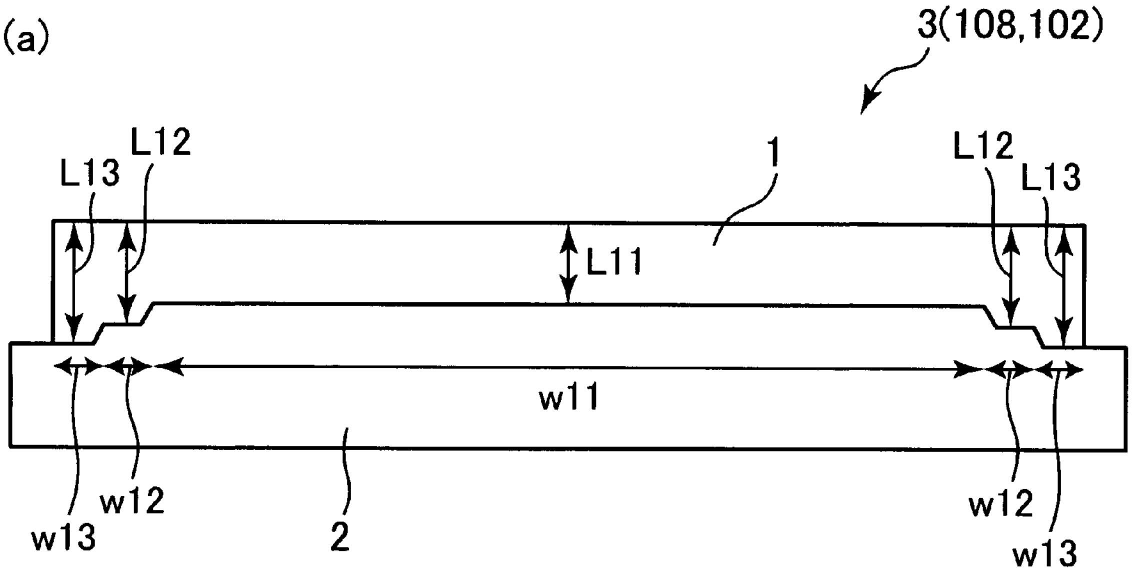
(b)
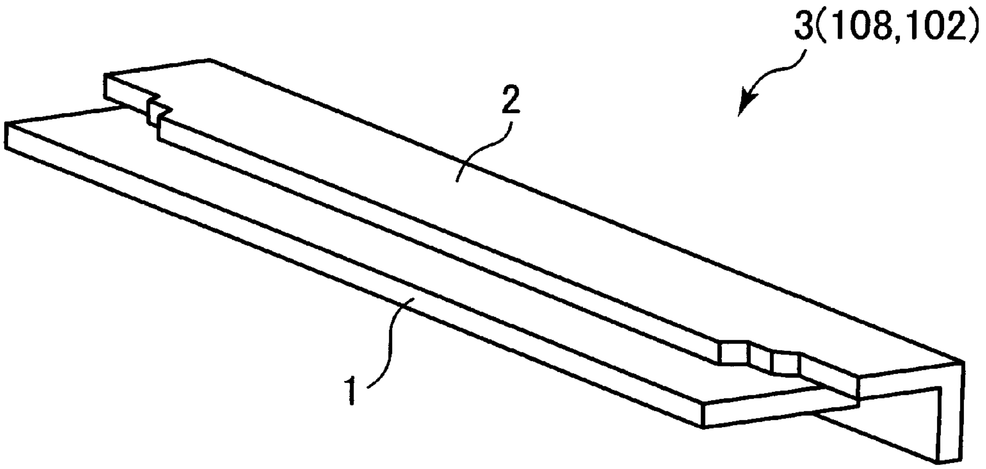
Fig. 19

(a) OCCURRENCE STATUS OF TURNING-UP OF BLADE FOR EACH NUMBER OF SHEETS

| FREE LENGTH | | | NUMBER OF SHEETS SUBJECTED TO SHEET PASSING (SHEETS) | | | | |
|---|---|---|---|---|---|---|---|
| L11 | L12 | L13 | 5000 | 10000 | 15000 | 20000 | 25000 |
| 8mm | 8mm | 8mm | ○ | ○ | × | – | – |
| 8mm | 9mm | 9mm | ○ | ○ | ○ | × | – |
| 8mm | 9mm | 10mm | ○ | ○ | ○ | ○ | ○ |
| 8mm | 10mm | 10mm | ○ | ○ | ○ | ○ | ○ |

○ : NOT OCCURRED
× : OCCURRED (b) OCCURRENCE STATUS OF IMPROPER CLEANING FOR EACH NUMBER OF SHEETS

| FREE LENGTH | | | NUMBER OF SHEETS SUBJECTED TO SHEET PASSING (SHEETS) | | | | |
|---|---|---|---|---|---|---|---|
| L11 | L12 | L13 | 5000 | 10000 | 15000 | 20000 | 25000 |
| 8mm | 8mm | 8mm | ○ | ○ | ○ | – | – |
| 8mm | 9mm | 9mm | ○ | ○ | ○ | ○ | – |
| 8mm | 9mm | 10mm | ○ | ○ | ○ | ○ | ○ |
| 8mm | 10mm | 10mm | ○ | ○ | △ | △ | × |

○ : NOT OCCURRED
△ : OCCURRED (SLIGHT)
× : OCCURRED

Fig. 22

(a) OCCURRENCE STATUS OF TURNING-UP OF BLADE FOR EACH NUMBER OF SHEETS

| FREE LENGTH | | | NUMBER OF SHEETS SUBJECTED TO SHEET PASSING (SHEETS) | | | | |
|---|---|---|---|---|---|---|---|
| L11 | L12 | L13 | 5000 | 10000 | 15000 | 20000 | 25000 |
| 8mm | 8mm | 8mm | ○ | ○ | ○ | × | – |
| 8mm | 9mm | 9mm | ○ | ○ | ○ | ○ | × |
| 8mm | 9mm | 10mm | ○ | ○ | ○ | ○ | ○ |
| 8mm | 10mm | 10mm | ○ | ○ | ○ | ○ | ○ |

○ : NOT OCCURRED
× : OCCURRED (b) OCCURRENCE STATUS OF IMPROPER CLEANING FOR EACH NUMBER OF SHEETS

| FREE LENGTH | | | NUMBER OF SHEETS SUBJECTED TO SHEET PASSING (SHEETS) | | | | |
|---|---|---|---|---|---|---|---|
| L11 | L12 | L13 | 5000 | 10000 | 15000 | 20000 | 25000 |
| 8mm | 8mm | 8mm | ○ | ○ | ○ | ○ | – |
| 8mm | 9mm | 9mm | ○ | ○ | ○ | ○ | ○ |
| 8mm | 9mm | 10mm | ○ | ○ | ○ | ○ | ○ |
| 8mm | 10mm | 10mm | ○ | ○ | ○ | △ | × |

○ : NOT OCCURRED
△ : OCCURRED (SLIGHT)
× : OCCURRED

Fig. 23

IMAGE FORMING APPARATUS

FIELD OF THE INVENTION AND RELATED ART

The present invention relates to an image forming apparatus, such as a copying machine, a printer, a facsimile machine, or a multi-function machine having functions of these machines, using an electrophotographic type or electrostatic recording type.

Conventionally, for example, the image forming apparatus such as the copying machine using the electrophotographic type includes a cleaning device for removing toner (transfer residual toner) remaining on an image bearing member after a toner image is transferred from the image bearing member such as a photosensitive member or an intermediary transfer member onto a transfer receiving member (toner image receiving member).

As the cleaning device, the following blade cleaning device has been widely used. The blade cleaning device includes a plate-like elastic member formed of an elastic material such as a rubber (herein, this elastic member is referred to as an "elastic blade") and a supporting member such as a supporting metal plate supporting the elastic blade. The elastic blade is fixed to the supporting member in many cases by bonding or the like in a manner such that a part of the elastic blade with respect to a short (side) direction is superposed on the supporting member along a longitudinal direction. Particularly, in the blade cleaning device, a cleaning property is high or the like, and therefore, a counter type in which the elastic blade is contacted to a surface of the image bearing member so as to opposite the surface of the image bearing member along a movement direction of the surface of the image bearing member has been employed in general.

However, in the blade cleaning device of this counter type, in the case where a frictional force between the elastic blade and the image bearing member becomes large, it has been known that a problem of "blade turning-up (turning-up of blade)" such that the elastic blade is turned up along the movement direction of the surface of the image bearing member can occur. Incidentally, in the case where the frictional force between the elastic blade and the image bearing member becomes large, it has been also known that problems such as squeaking of the elastic blade (occurrence of noise) and chattering (occurrence of vibration) can occur, but these problems will be described by principally using the "blade turning-up" as a representative.

Japanese Laid-Open Patent Application (JP-A) 2006-259394 proposes a constitution in which the occurrence of the blade turning-up is suppressed by making a free length of the elastic blade at an end portion with respect to a longitudinal direction longer than a free length of the elastic blade at a central portion with respect to the longitudinal direction. Incidentally, the "free length" of the elastic blade refers to a length, with respect to the short direction, of a portion projected from a supporting member or a regulating member which is provided in contact with or opposed to a surface of the elastic blade and which regulates (restricts) deformation of the elastic blade on a free end portion side.

Further, JP-A 2009-42581 proposes a constitution in which the blade turning-up is suppressed by performing a curing treatment of an isocianate compound with which an end portion of the elastic blade with respect to the longitudinal direction is impregnated.

However, in the constitution of JP-A 2006-259394, a relationship between the free length of the elastic blade at the longitudinal end portion and the free length of the elastic blade at the longitudinal central portion is merely defined. For that reason, in the case where a region in which the free length of the elastic blade is made long is narrow, there is a still possibility that the blade turning-up occurs. Further, in the case where the region in which the free length of the elastic blade is made long is broad, there is a possibility that improper cleaning (defective cleaning) occurs.

Incidentally, JP-A 2009-42581 is silent about that the free length of the elastic blade is made different in a position of the elastic blade with respect to the longitudinal direction.

SUMMARY OF THE INVENTION

A principal object of the present invention is to provide an image forming apparatus capable of suppressing improper cleaning while suppressing blade turning-up.

This object is accomplished by an image forming apparatus according to the present invention.

According to an aspect of the present invention, there is provided an image forming apparatus comprising: an image bearing member; a developer carrying member configured to carry a developer and to develop a latent image, formed on the image bearing member, into a toner image; and a cleaning member configured to remove the developer from a surface of the image bearing member and including an elastic blade of which free end portion contacts the surface of the image bearing member along a widthwise direction substantially perpendicular to a movement direction of the surface of the image bearing member and a regulating portion configured to regulate a free length of the elastic blade on a base end portion side opposite from the free end portion with respect to a direction crossing the widthwise direction of the elastic blade, wherein at each of opposite end portions with respect to the widthwise direction, an end portion of a developing region which is a region in which the developer carrying member is capable of carrying the developer is positioned outside an end portion of an image forming region in which an image on the image bearing member is capable of being formed, and an end portion of a contact width in which the elastic blade and the image bearing member are in contact with each other is positioned outside the end portion of the developing region, and wherein when an average of a free length L1 [mm] of the elastic blade in the image bearing region in the widthwise direction of the elastic blade is an average free length L1*a* [mm], an average of a free length L2 [mm] of the elastic blade on an outside of the developing region in the widthwise direction of the elastic blade is an average free length L2*a* [mm], and an absolute value of a difference between the average free length L1*a* and the average free length L2*a* is a free length difference ΔL [mm], the following relationships are satisfied:

$$L2a \geq 1.2 \times L1a,$$

$$L2 \geq L2a - \Delta L \times 0.2, \text{ and}$$

$$L1 \leq L1a + \Delta L \times 0.2.$$

Further features of the present invention will become apparent from the following description of exemplary embodiments with reference to the attached drawings.

Figure 3:
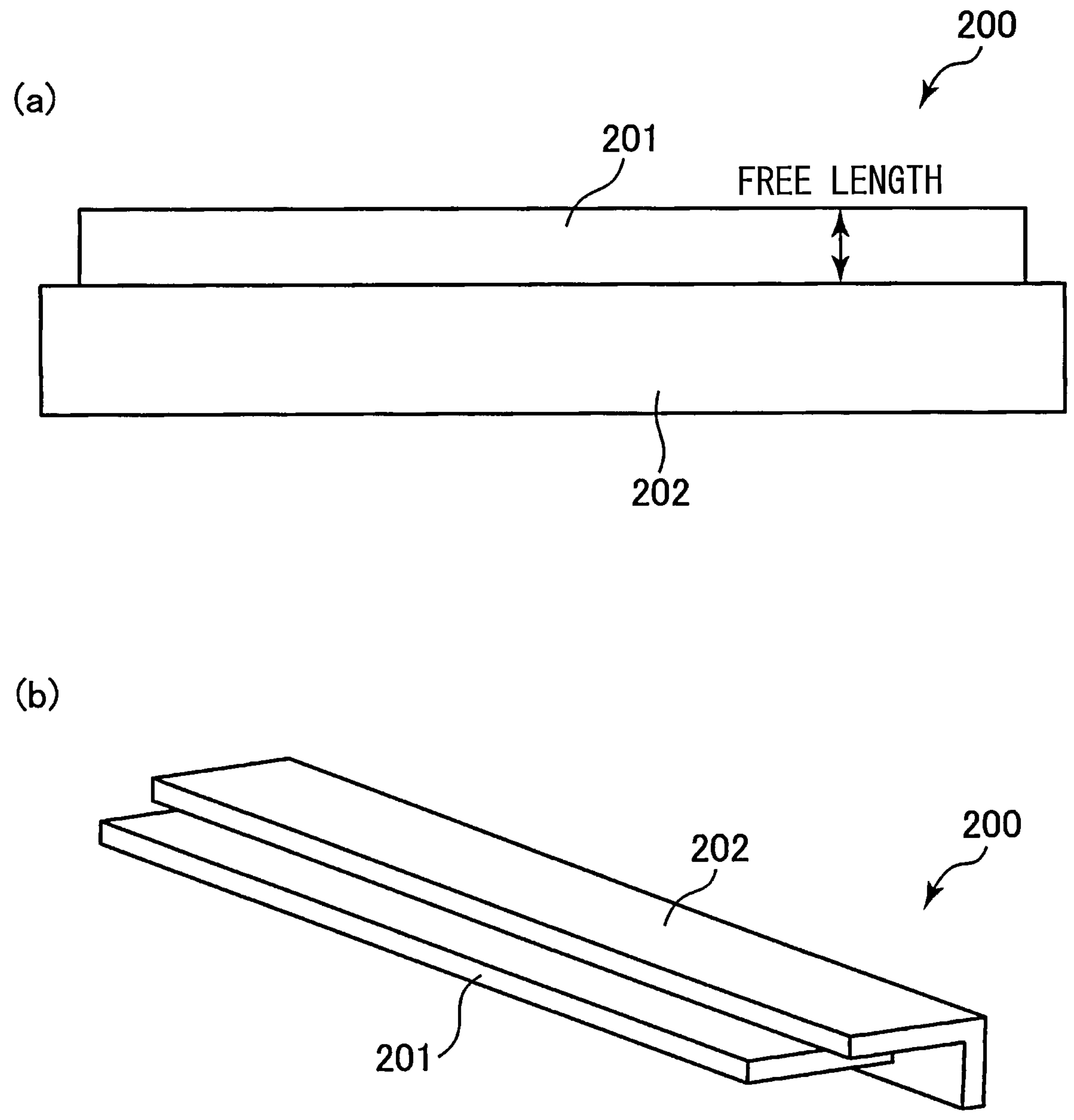
Fig. 3 PRIOR ART

Parts (a) and (b) of FIG. 3 are schematic views of a conventional cleaning blade.

Figure 4:
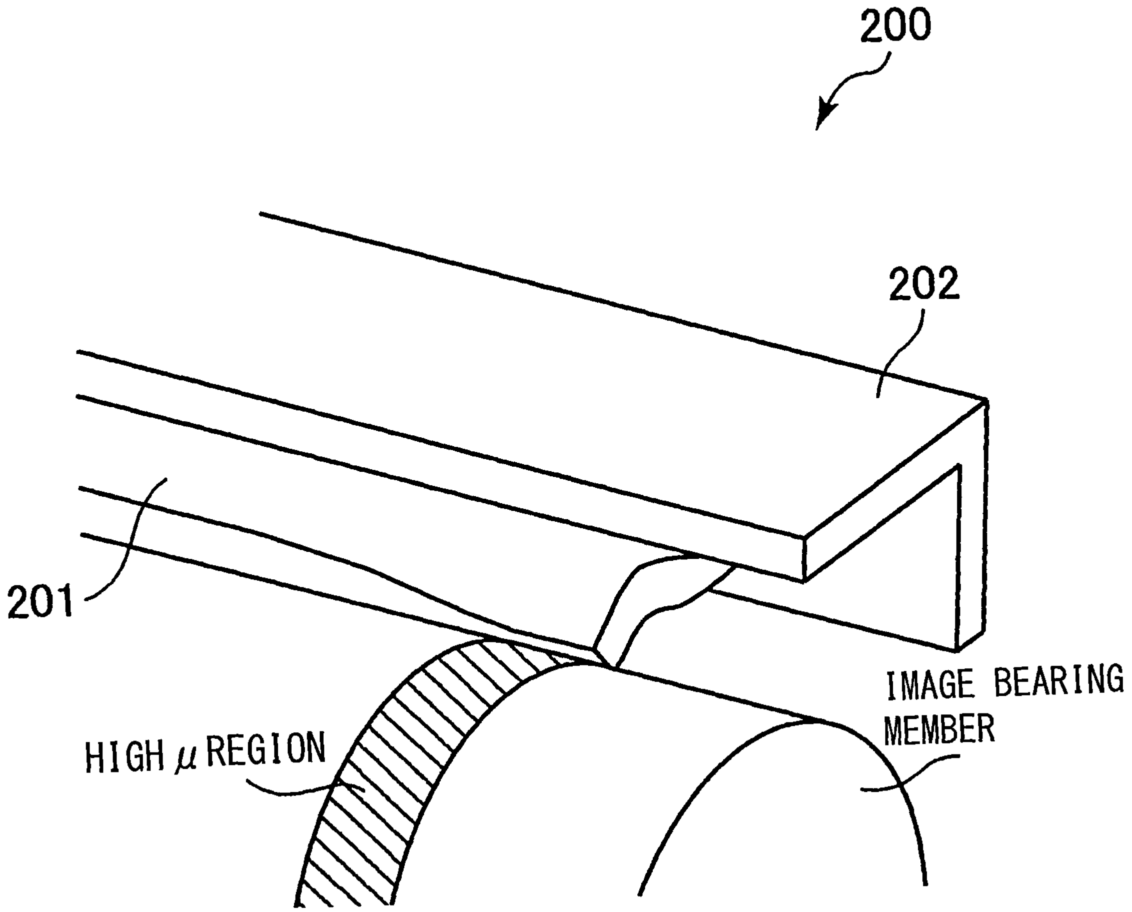
Fig. 4 PRIOR ART

FIG. 4 is a schematic view showing a deformation state of the conventional cleaning blade in a high μ region.

Parts (a) and (b) of FIG. 5 are schematic views of a cleaning blade in an embodiment 1.

Figure 6:
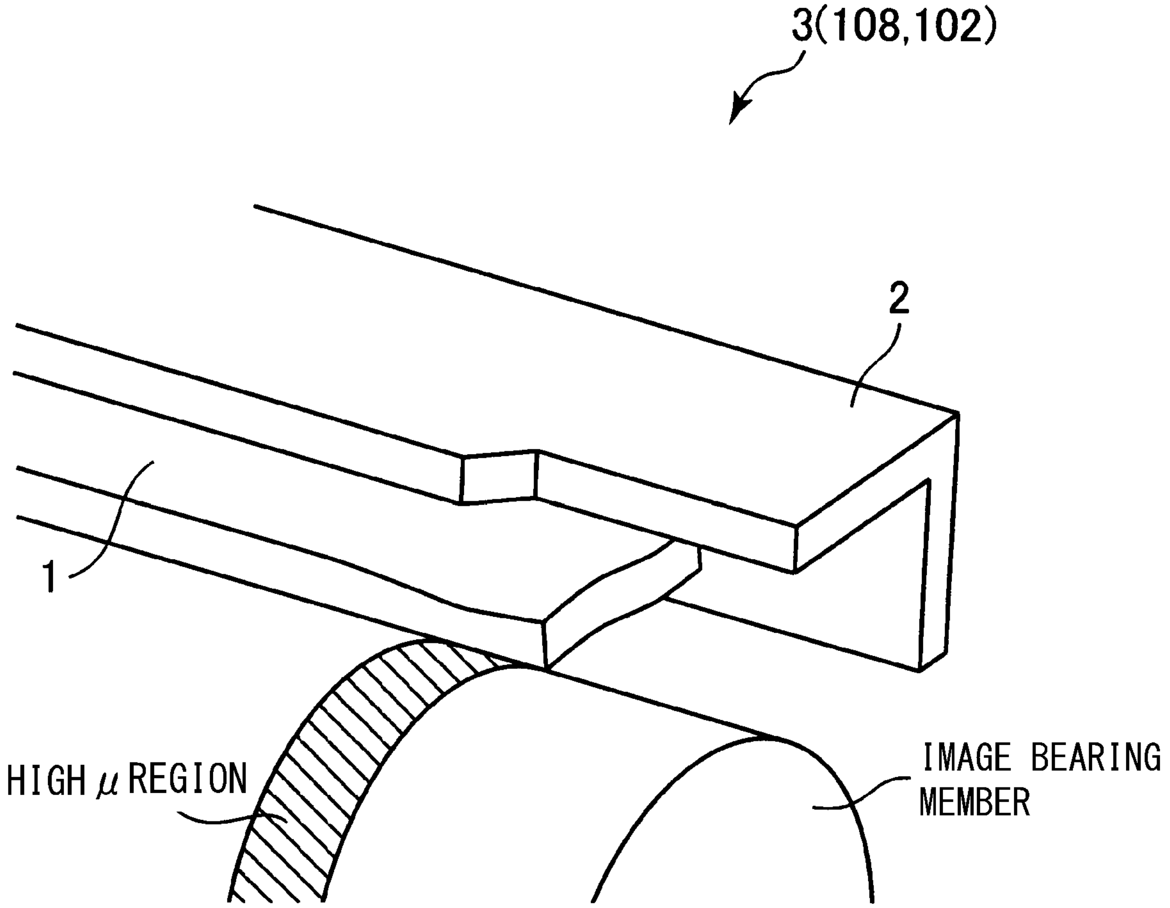

FIG. 6 is a schematic view showing a deformation state of the cleaning blade in the embodiment 1 in a high μ region.

Figure 7:
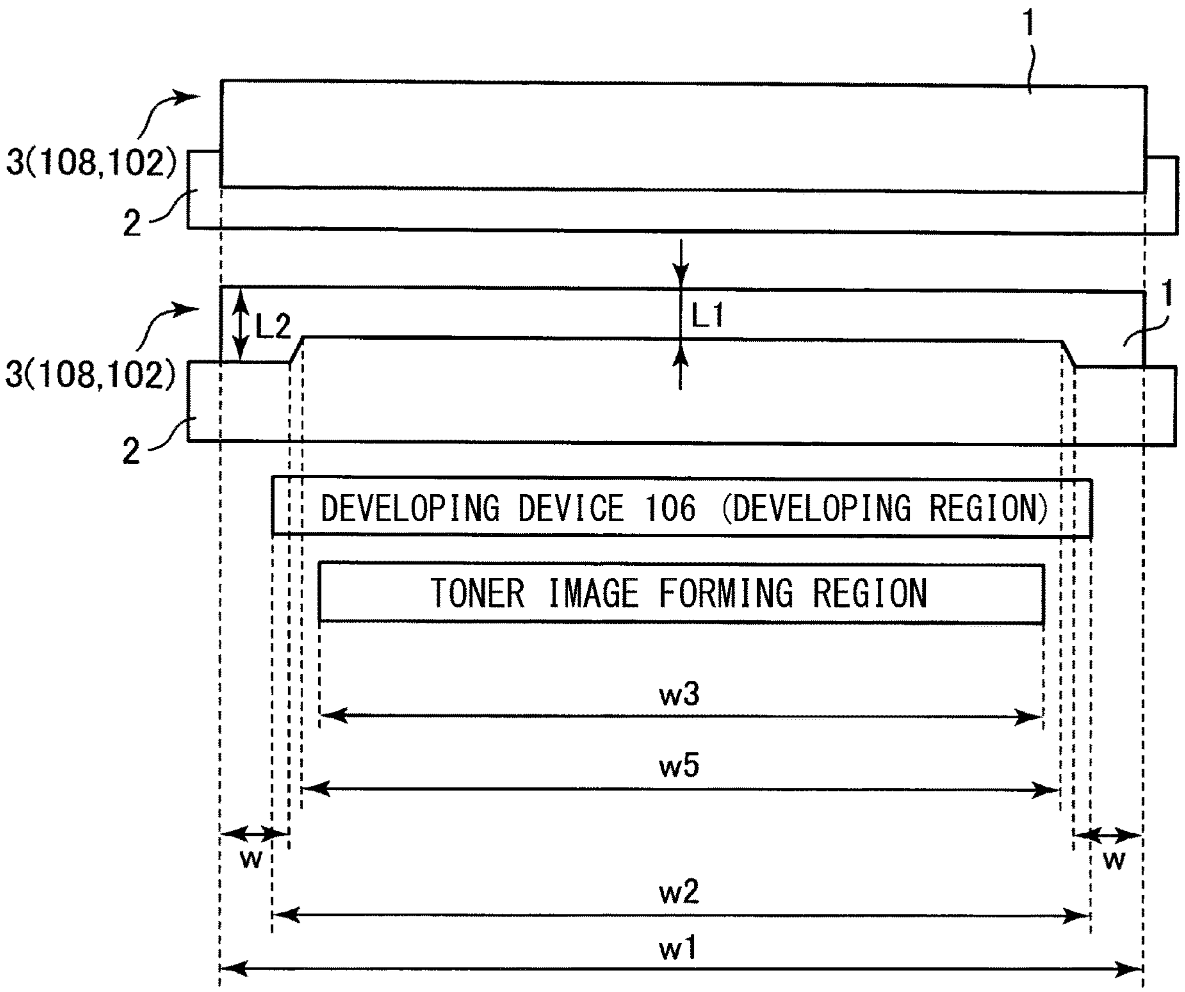

FIG. 7 is an illustration of longitudinal widths of respective portions of the cleaning blade in the embodiment 1.

Parts (a) and (b) of FIG. 8 are tables showing an experimental result in the embodiment 1.

Parts (a) and (b) of FIG. 9 are tables showing an experimental result in the embodiment 1.

FIG. 10 is a table showing an experimental result in the embodiment 1.

Figure 11:
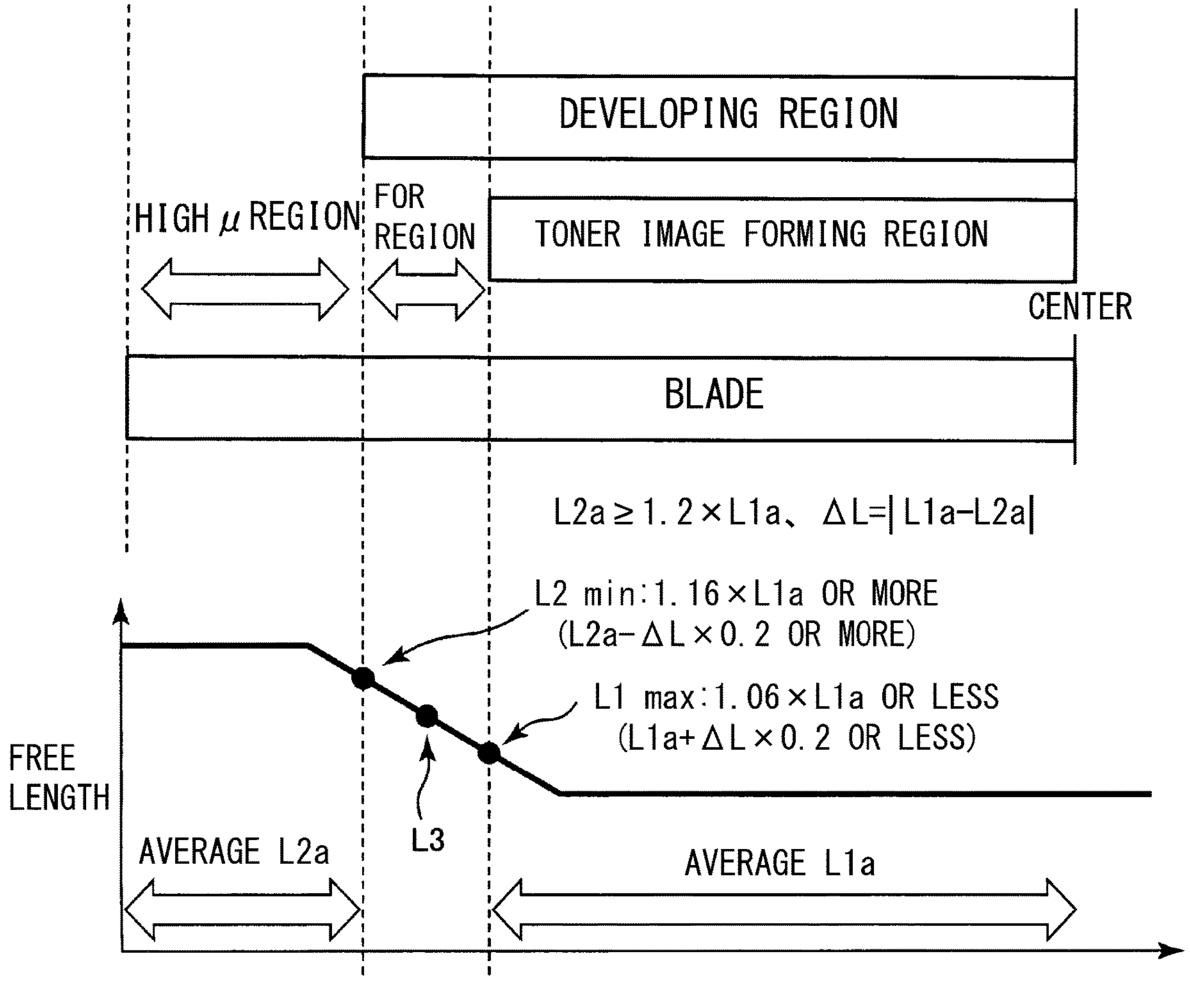

FIG. 11 is an illustration of a modified embodiment of the embodiment 1.

Parts (a) and (b) of FIG. 12 are tables showing an experimental result in a modified embodiment of the embodiment 1.

Parts (a) and (b) of FIG. 13 are schematic views of a cleaning blade in an embodiment 2.

Figure 14:
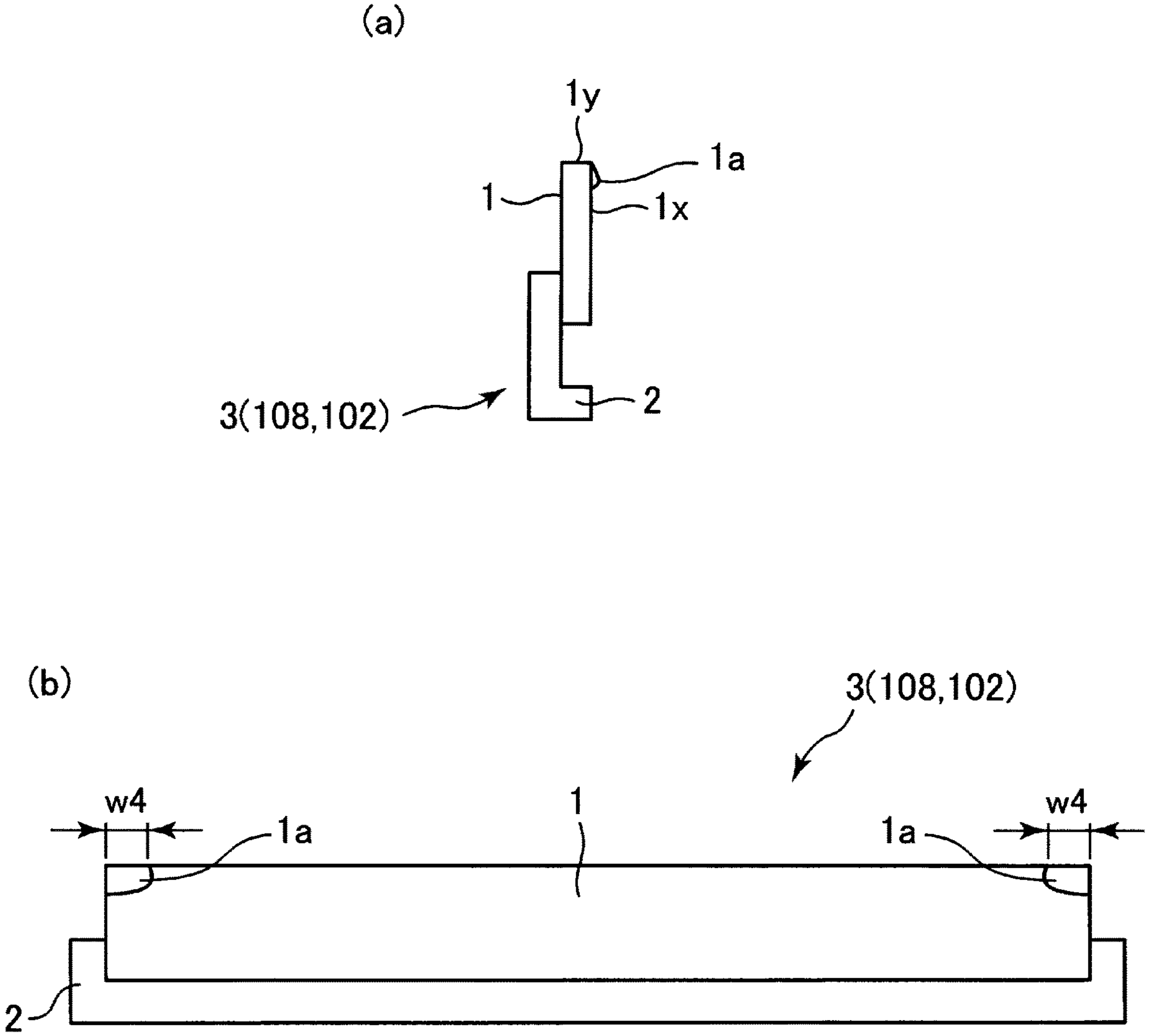

Parts (a) and (b) of FIG. 14 are schematic views of a cleaning blade in an embodiment 3.

Figure 15:
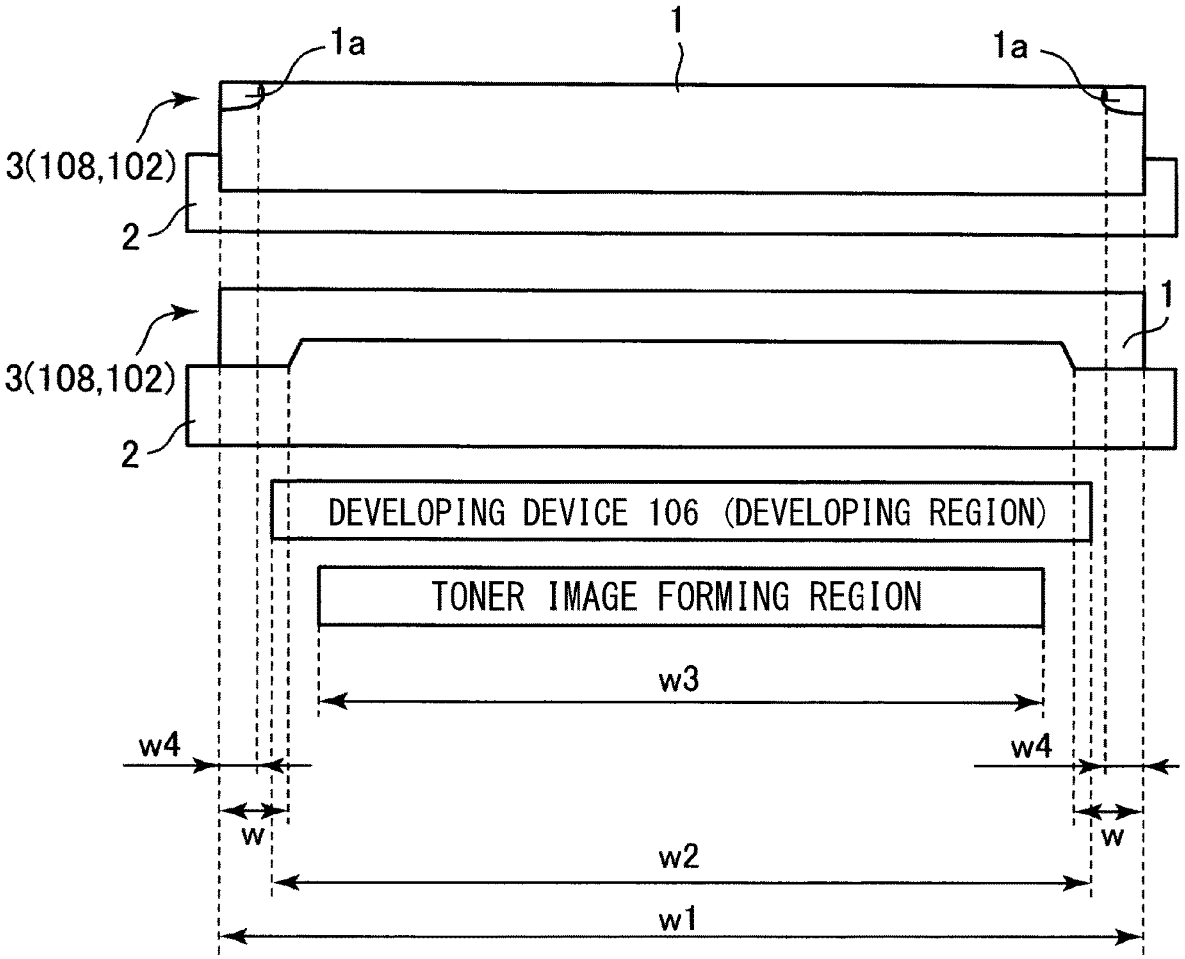

FIG. 15 is an illustration of longitudinal widths of respective portions of the cleaning blade in the embodiment 3.

Parts (a), (b), and (c) of FIG. 16 are tables showing an experimental result in the embodiment 3.

Parts (a) and (b) of FIG. 17 are illustrations of a longitudinal arrangement of respective portions in an embodiment 4.

Figure 18:
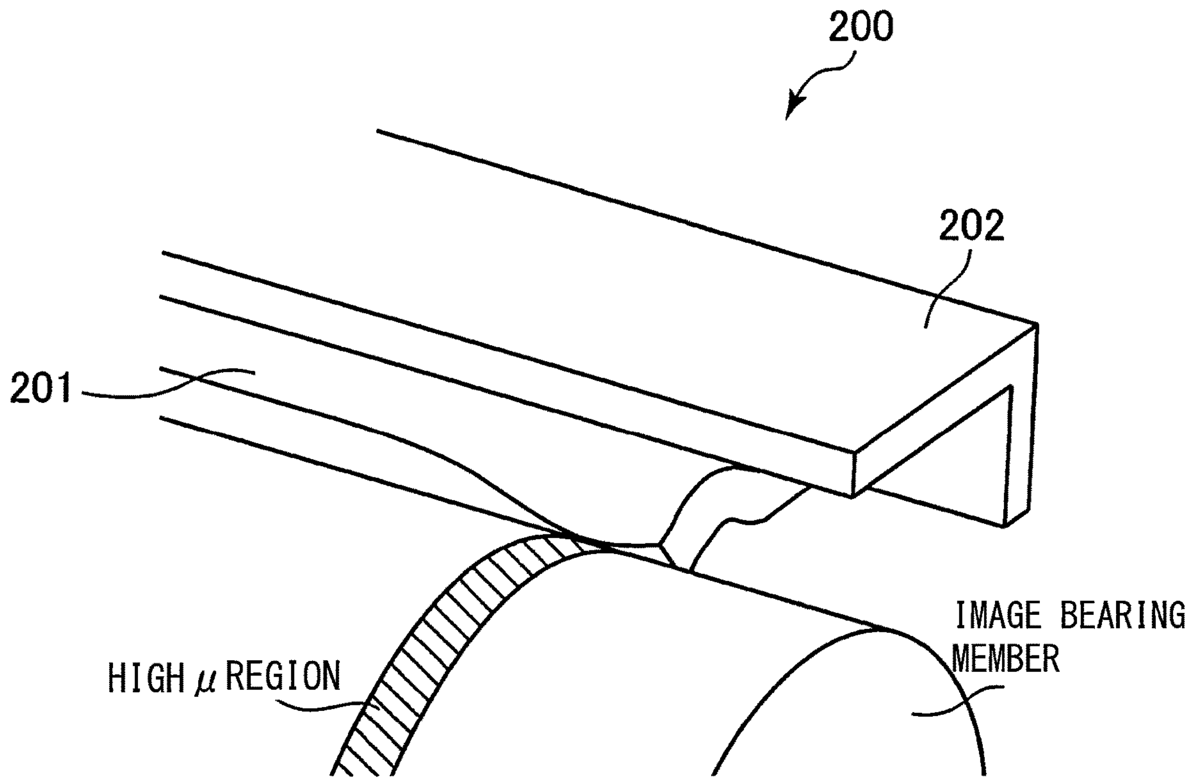
Fig. 18 PRIOR ART

FIG. 18 is a schematic view showing a deformation state of the conventional cleaning blade in the high μ region.

Parts (a) and (b) of FIG. 19 are schematic views of a cleaning blade in the embodiment 4.

Figure 20:
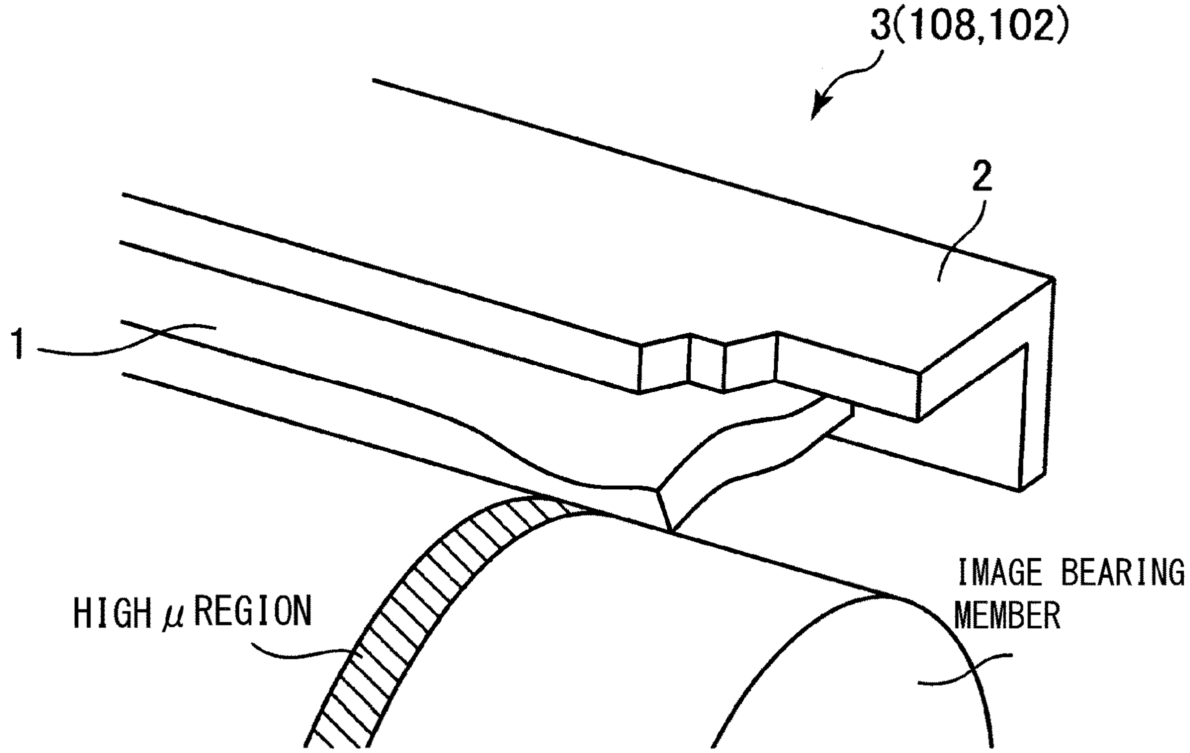

FIG. 20 is a schematic view showing deformation state of the cleaning blade in the embodiment 4 in a high μ region.

Figure 21:
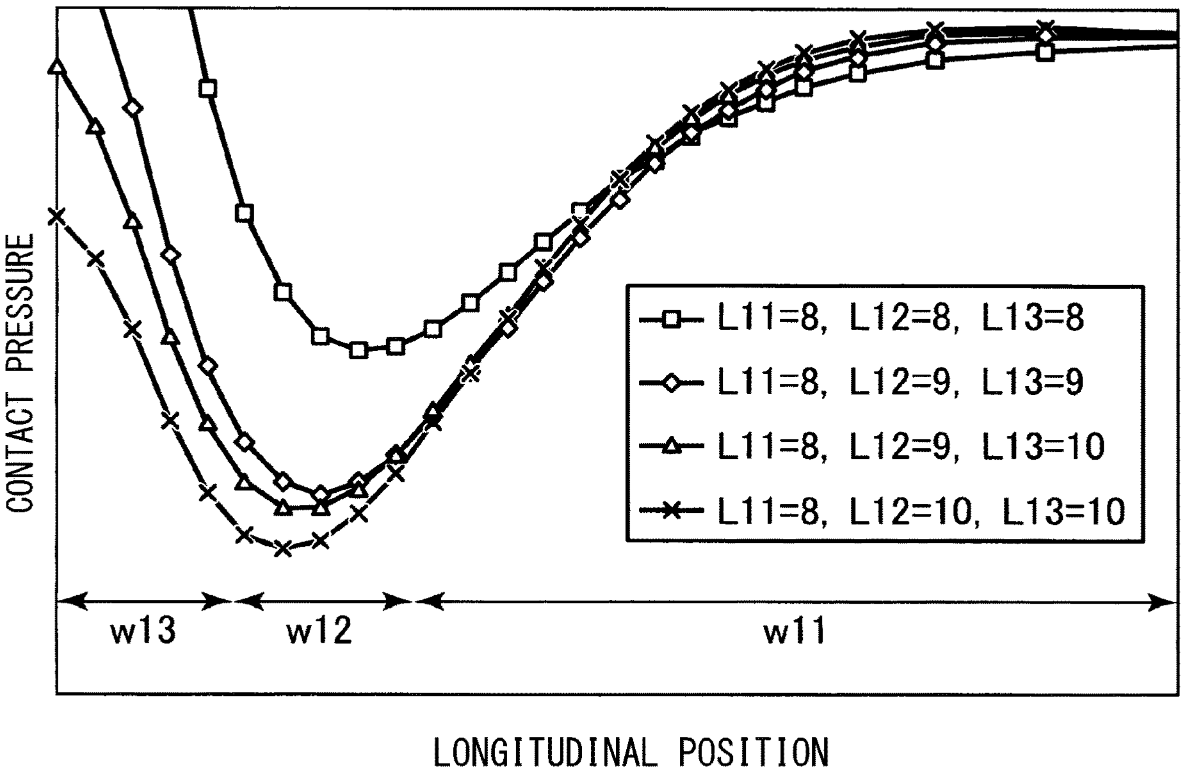

FIG. 21 is an illustration of a contact pressure distribution of the cleaning blade in the neighborhood of an end portion.

Parts (a) and (b) of FIG. 22 are schematic views showing an experimental result in the embodiment 4.

Parts (a) and (b) of FIG. 23 are schematic views showing an experimental result in the embodiment 4.

DESCRIPTION OF THE EMBODIMENTS

In the following, an image forming apparatus according to the present invention will be described specifically with reference to the drawings.

Embodiment 1

1. General Structure and Operation of Image Forming Apparatus

Figure 1:
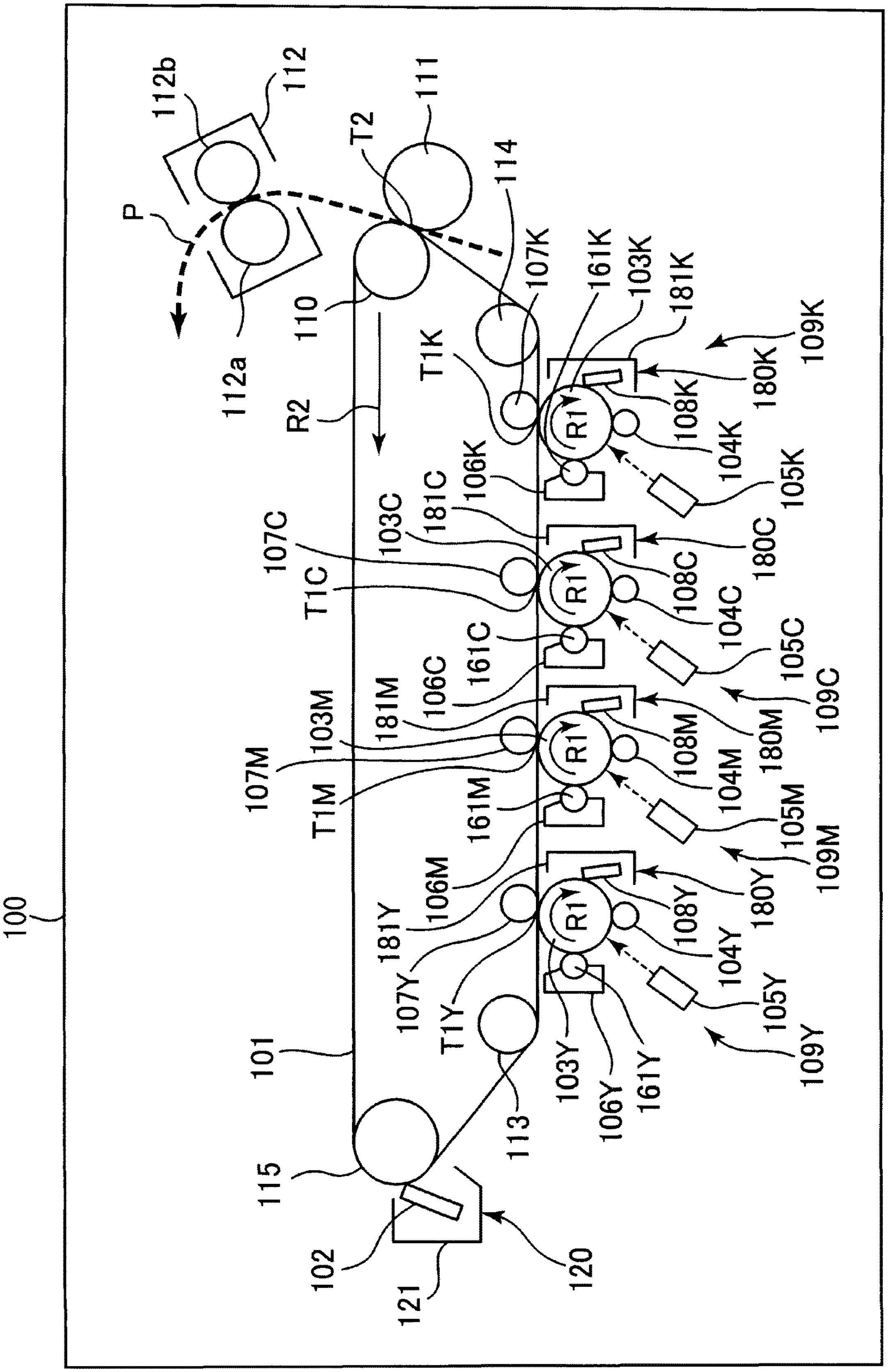
FIG. 1 is a schematic sectional view of an image forming apparatus.

FIG. 1 is a schematic sectional view of an image forming apparatus 100 of this embodiment. The image forming apparatus 100 is a full-color printer of a tandem type employing an electrophotographic type and an intermediary transfer type, in which a plurality of image forming units (image forming portions) 109Y, 109M, 109C, and 109K are arranged along a movement direction of a surface of an intermediary transfer belt 101. In this embodiment, the image forming apparatus 100 includes, as the plurality of image forming units, the image forming units 109Y, 109M, 109C, and 109K.

For example, during full-color image formation, in the image forming unit 109Y for yellow, a yellow toner image is formed on a photosensitive drum 103Y and is primary-transferred onto the intermediary transfer belt 101. In the image forming unit 109M for magenta, a magenta toner image is formed on a photosensitive drum 103M and is primary-transferred superposedly onto the yellow toner image onto the intermediary transfer belt 101. Similarly, in the image forming units 109C and 109K for cyan and black, a cyan toner image and a black toner image are formed on photosensitive drums 103C and 103K are primary-transferred superposedly onto the toner images transferred early on the intermediary transfer belt 101.

The toner images primary-transferred onto the intermediary transfer belt 101 are secondary-transferred onto a recording material P.

The recording material P on which the toner images are secondary-transferred is separated (curvature-separated in this embodiment) from the intermediary transfer belt 101 and is sent to a fixing device 112. The fixing device 112 heats and presses the recording material P by a fixing roller 112*a* and a pressing roller 112*b* and fixes an image on a surface of the recording material P by melting toner. Thereafter, the recording material P on which the image is fixed is discharged (outputted) to an outside of an apparatus main assembly.

An image forming process will be further described. Constitutions of the image forming units 109Y, 109M, 109C and 109K are substantially the same except that colors of toners used in developing devices 106Y, 106M, 106C, and 106K are yellow, magenta, cyan, and black, respectively, different from each other. As regards elements having the same or corresponding functions or constitutions for respective colors, suffixes Y, M, C, and K of reference numerals or symbols representing the elements for associated colors are omitted and are collectively described in some instances.

The image forming unit 109 includes the photosensitive drum 103 which is drum-type (cylindrical) photosensitive member (electrophotographic photosensitive member) as a first image bearing member. Further, the image forming unit 109 includes the following means provided at a periphery of the photosensitive drum 103. First, a charging roller 104 which is a roller-type charging member as a charging means is provided. Further, an exposure device (laser beam scanner) 105 as an exposure means is provided. Further, the developing device 106 as a developing means is provided. Further, a primary transfer roller 107 which is a roller-type primary transfer member as a primary transfer means is provided. Further, a photosensitive member cleaning device 180 as a photosensitive member cleaning means including a photosensitive member cleaning blade 108 is provided.

The photosensitive drum 103 is constituted by forming a photosensitive layer of a negative polarity in charge polarity on a surface of an aluminum bare tube. The photosensitive drum 103 is rotationally driven at a peripheral speed (process speed) of 0.3 m/s in an arrow R1 direction (clockwise direction) in FIG. 1 by a driving motor (not shown) as a driving means.

To the charging roller 104, a DC voltage of a negative polarity is applied as a charging voltage (charging bias), so that the surface of the photosensitive drum 103 is electrically charged uniformly to a predetermined potential of the negative polarity.

The exposure device 105 scans the surface of the photosensitive drum 103, by a rotating mirror, with a laser beam ON/OFF-modulated on the basis of a scanning line image data developed from a separated color image corresponding to the associated image forming unit 109 and irradiates the charged surface of the photosensitive drum 103 with the light (laser beam). By this, the exposure device 105 writes (forms) an electrostatic image (electrostatic latent image) depending on the image data on the photosensitive drum 103.

The developing device 106 triboelectrically charges, by a stirring member, a two-component developer containing toner (non-magnetic toner particles) of the negative polarity in charge polarity and a carrier (magnetic carrier particles). The developer is fed by a feeding member and is caused on a developing sleeve 16 as a developer carrying member (developing member). The developer carried on the developing sleeve 161 is regulated in thickness thereof by a regulating blade (not shown), and thereafter is conveyed to an opposing portion to the photosensitive drum 103. The developing sleeve 161 is held while being spaced from the photosensitive drum 103 with a predetermined distance. To the developing sleeve 161, as a developing voltage (developing bias), an oscillating voltage in which a DC voltage of the negative polarity and an AC voltage are superposed with each other is applied. By this, negatively charged toner is moved to an exposed portion (image portion) on the photosensitive drum 103 of a polarity which is positive relative to a potential of the developing sleeve 161, so that the electrostatic image is developed. Thus, in this embodiment, on the exposed portion (image portion) where an absolute value of the potential is lowered by subjecting the photosensitive drum surface to light after uniformly charging the photosensitive drum surface, the toner charged to the same polarity (negative polarity in this embodiment) as the charge polarity of the photosensitive drum 103 is deposited (reverse development type). In this embodiment, a normal charge polarity of the toner which is a principal charge polarity of the toner during development is the negative polarity.

In this embodiment, as the toner, known toner in which a colorant, a charge control agent and the like are added to a binder resin can be used. Further, as the toner, toner of 5 μm or move and 15 μm or less in volume-average particle size can be suitably used. In this embodiment, for each of all the colors of yellow, magenta, cyan, and black, toner of 6 μm in volume-average particle size was used.

The intermediary transfer belt 101 which is an intermediary transfer member constituted by an endless belt (belt member) as a second image bearing member is provided opposed to the photosensitive drums 103. The intermediary transfer belt 101 is stretched by being extended around, as a plurality of stretching rollers, a driving roller 110, auxiliary rollers 113 and 114, and a tension roller 115 under a predetermined tension.

The driving roller 110 is driving member for transmitting a driving force to the intermediary transfer belt 101. The auxiliary rollers 113 and 114 form an image transfer surface of the intermediary transfer belt 101 onto which the toner images are transferred from the photosensitive drums 103. The tension roller 115 imparts a predetermined tension to the intermediary transfer belt 101. The intermediary transfer belt 101 is rotated (moved and circulated) at a peripheral speed (process speed) corresponding to the peripheral speed of the photosensitive drum 103 in an arrow R2 direction (counterclockwise direction) in FIG. 1 by being rotationally driven by driving the driving roller 110 by a driving motor (not shown) as a driving means. The driving roller 110 also has a function as an inner secondary transfer roller provided at a secondary transfer portion T2. The number of the rollers stretching the intermediary transfer belt 101 is not limited to the number of the rollers in this embodiment.

On an inner peripheral surface side of the intermediary transfer belt 101, primary transfer rollers 107 are provided corresponding to the photosensitive drums 103. Each of the primary transfer rollers 107 presses the intermediary transfer belt 101 toward the associated photosensitive drum 103, and forms a primary transfer portion (primary transfer nip) T1. To the primary transfer roller 107, a DC voltage of a positive polarity which is an opposite polarity to the normal charge polarity of the toner is applied as a primary transfer voltage (primary transfer bias). By this, the toner image carried on the photosensitive drum 103 is primary-transferred onto the rotating intermediary transfer belt 101 in the primary transfer portion T1.

On an outer peripheral surface side of the intermediary transfer belt 101, in a position opposing the driving roller 110, a secondary transfer roller (outer secondary transfer roller) 111 which is a roller-type secondary transfer member as a secondary transfer means is provided. The secondary transfer roller 111 forms a secondary transfer portion (secondary transfer nip) T2 in contact with an outside surface of the intermediary transfer belt 111 of which inside surface is supported by the driving roller (opposing roller, inner secondary transfer roller) 110. The secondary transfer roller 111 is pressed toward the driving surface 110 through the intermediary transfer belt 101. To the secondary transfer roller 111, as a secondary transfer voltage (secondary transfer bias), a DC voltage of the positive polarity which is the opposite polarity to the normal charge polarity of the toner is applied. By this, the toner images carried on the intermediary transfer belt 101 are secondary-transferred onto the recording material P, in the secondary transfer portion T2, nipped and conveyed by the intermediary transfer belt 101 and the secondary transfer roller 111.

The recording material P on which the toner images are secondary-transferred is, as described above, conveyed to the fixing device 112 and is subjected to a fixing process, and thereafter is discharged (outputted) to the outside of the apparatus main assembly of the image forming apparatus 100.

Toner (primary transfer residual toner) remaining on the photosensitive drum 103 after the primary transfer is removed and collected from the surface of the photosensitive drum 103 by the photosensitive member cleaning device 180. In this embodiment, the photosensitive member cleaning device 180 is a blade cleaning device of a counter type. The photosensitive member cleaning device 180 includes a photosensitive member cleaning container 181 and the photosensitive member cleaning blade 108 as a cleaning member. The photosensitive member cleaning blade 108 contacts the surface of the photosensitive drum 103 so as to oppose the surface movement direction of the photosensitive drum 103 and collects the primary transfer residual toner in the photosensitive member cleaning container 181 by scraping off the primary transfer residual toner from the surface of the rotating photosensitive drum 103. The photosensitive member cleaning blade 108 is constituted by including a plate-like elastic member ("elastic blade") 1 (FIG. 5) formed of an elastic material and a supporting metal plate 2 (FIG. 5) as a supporting member for supporting the elastic blade 1. In this embodiment, the elastic blade 1 of the photosensitive member cleaning blade 108 is a flat plate-like member which has a predetermined length with respect to each of a longitudinal direction along (in this embodiment, substantially parallel to) a direction (widthwise direction) substantially perpendicular to the surface movement direction of the photosensitive drum 103 and with respect to a short(-side) direction crossing (substantially perpendicular to) the longitudinal direction and which has a predetermined thickness and a rectangular shape in a plan view. In this embodiment, as a material of this elastic blade 1, for example, an urethane rubber of 77° in (JIS-A) hardness and 2 mm in thickness is used. This elastic blade 1 is superposed on the supporting metal plate 2 along the longitudinal direction at a part of a side, opposite from the photosensitive drum 103 side, which is a base end portion side as one end portion with respect to the short direction, and thus is fixed to the supporting metal plate 2 by bonding in this embodiment. Further, this elastic blade 1 is directed toward an upstream side of the surface movement direction of the photosensitive drum 103 at a free end portion thereof which is the other end portion with respect to the short direction and is contacted to the surface of the photosensitive drum 103 at an edge portion of the free end portion. In this embodiment, the elastic blade 1 of the photosensitive member cleaning blade 108 is contacted to the photosensitive drum 103 with a linear pressure of 30 N/m at a contact angle of 22° relative to the photosensitive drum 103. This contact angle is an angle formed relative to a tangential line of the photosensitive drum 103 by a surface of the elastic blade 1 on the photosensitive drum 103 side in the neighborhood of the edge portion of the elastic blade 1 in a contact portion between the elastic blade 1 and the photosensitive drum 103. Further, the linear pressure is an average of pressures of the elastic blade 1 in entire area with respect to the longitudinal direction.

Toner (secondary transfer residual toner) remaining on the intermediary transfer belt 101 after the secondary transfer is removed and collected from the surface of the intermediary transfer belt 101 by an intermediary transfer member cleaning device 120 as an intermediary transfer member cleaning means. In this embodiment, the intermediary transfer member cleaning device 120 is a blade cleaning device of a counter type. The intermediary transfer member cleaning device 120 includes an intermediary transfer member cleaning container 121 and an intermediary transfer member cleaning blade 102 as a cleaning member. The intermediary transfer member cleaning blade 102 contacts an outside surface of the intermediary transfer belt 101 of which inside surface is supported by the tension roller 115. That is, the intermediary transfer member cleaning blade 102 contacts the outside surface of the intermediary transfer belt 101 on a side downstream of the secondary transfer portion T2 and upstream of a mostupstream primary transfer portion T1Y with respect to the surface movement direction of the photosensitive drum 103. In other words, the secondary transfer roller 111 contacts the outside surface of the intermediary transfer belt 101 on a side downstream of a most downstream primary transfer portion T1K and upstream of the intermediary transfer belt cleaning blade 102 with respect to the surface movement direction (toner image moving direction) of the intermediary transfer belt 101. The intermediary transfer member cleaning blade 102 contacts the surface of the intermediary transfer belt 101 so as to oppose the surface movement direction of the intermediary transfer belt 101. The intermediary transfer member cleaning blade 102 collects the secondary transfer residual toner in the intermediary transfer member cleaning container 121 by scraping off the secondary transfer residual toner from the surface of the rotating intermediary transfer belt 101. The intermediary transfer belt cleaning blade 102 is constituted by including a plate-like elastic member ("elastic blade") 1 (FIG. 5) formed of an elastic material and a supporting metal plate 2 (FIG. 5) as a supporting member for supporting the elastic blade 1. In this embodiment, the elastic blade 1 of the intermediary transfer member cleaning blade 102 is a flat plate-like member which has a predetermined length with respect to each of a longitudinal direction along (in this embodiment, substantially parallel to) a direction (widthwise direction) substantially perpendicular to the surface movement direction of the intermediary transfer belt 101 and with respect to a short(-side) direction crossing (substantially perpendicular to) the longitudinal direction and which has a predetermined thickness and a rectangular shape in a plan view. In this embodiment, as a material of this elastic blade 1, for example, an urethane rubber of 77° in (JIS-A) hardness and 2 mm in thickness is used. This elastic blade 1 is superposed on the supporting metal plate 2 along the longitudinal direction at a part of a side, opposite from the intermediary transfer belt 101 side, which is a base end portion side as one end portion with respect to the short direction, and thus is fixed to the supporting metal plate 2 by bonding in this embodiment. Further, this elastic blade 1 is directed toward an upstream side of the surface movement direction of the photosensitive drum 103 at a free end portion thereof which is the other end portion with respect to the short direction and is contacted to the surface of the intermediary transfer belt 101 at an edge portion of the free end portion. In this embodiment, the elastic blade 1 of the intermediary transfer member cleaning blade 102 is contacted to the intermediary transfer belt 101 with a linear pressure of 35 N/m at a contact angle of 25° relative to the intermediary transfer belt 101. This contact angle is an angle formed relative to a tangential line of the intermediary transfer belt 101 by a surface of the elastic blade 1 on the intermediary transfer belt 101 side in the neighborhood of the edge portion of the elastic blade 1 in a contact portion between the elastic blade 1 and the intermediary transfer belt 101. Further, the linear pressure is an average of pressures of the elastic blade 1 in entire area with respect to the longitudinal direction.

2. Black Turning-Up

Figure 2:
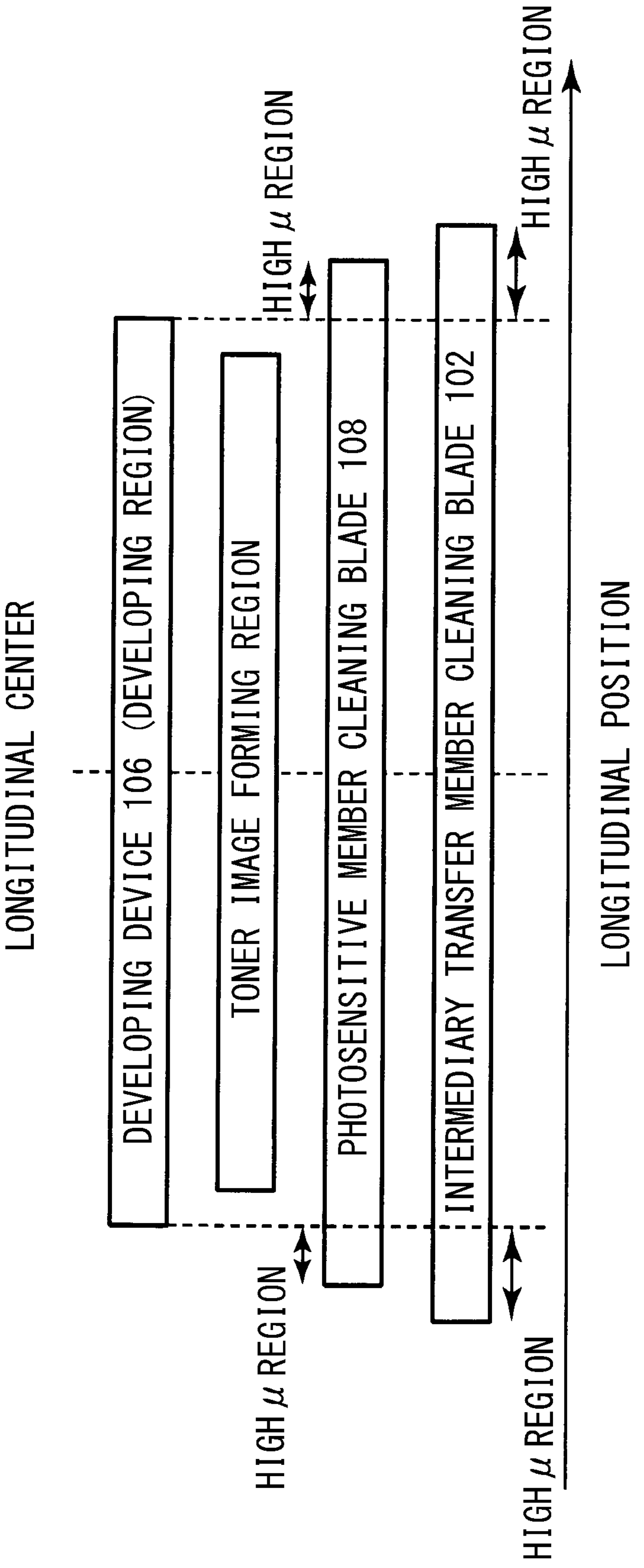
FIG. 2 is an illustration of a longitudinal arrangement of a principal part of the image forming apparatus.

FIG. 2 is an illustration of an arrangement of principal elements of the image forming apparatus 100 in a direction (herein simply also referred to as a "longitudinal direction") substantially perpendicular to a process direction (surface movement directions of the photosensitive drum 103 and the intermediary transfer belt 101). Incidentally, in FIG. 2, lengths of the respective elements in the longitudinal direction (herein, these lengths are simply also referred to as "longitudinal widths") are length in the following regions. The longitudinal width of the developing device 106 is a width in which the developing device 106 is capable of supplying the developer in the longitudinal direction. That is, this longitudinal width refers to a width in a region in which the developing sleeve 161 is capable of carrying the developer (i.e., a width in which the developer is coated on the developing sleeve 161). The region of the longitudinal width of this developing device 106 is also referred to as a "developing region". In general, the developing sleeve 161 is subjected to processing (blasting or groove-forming processing) in which unevenness (projections and recesses) is formed on the surface of the developing sleeve 161 so as to be capable of carrying and conveying the developer. The developing region corresponds to a region in which this unevenness is formed. Further, the longitudinal width of a toner image forming region (image forming region) refers to a width of the "toner image forming region" which is a region in which the exposure device 105 is capable of forming the toner image by forming the electrostatic image through laser exposure of the photosensitive drum surface with the laser beam (i.e., a maximum image formable width). Further, the longitudinal width of the photosensitive member cleaning blade 108 refers to a width of the elastic blade 1 (contact portion between the elastic blade 1 and the photosensitive drum 103) of the photosensitive member cleaning blade 108 with respect to the longitudinal direction. A region of this longitudinal width of the photosensitive member cleaning blade 108 is also referred to as a "photosensitive member cleaning region" or is simply referred to as a "cleaning region".

Further, the longitudinal width of the intermediary transfer member cleaning blade 102 refers to a width of the elastic blade 1 (contact portion between the elastic blade 1 and the intermediary transfer belt 101) of the intermediary transfer belt cleaning blade 102 with respect to the longitudinal direction. A region of this longitudinal width of the intermediary transfer member cleaning blade 102 is also referred to as an "intermediary transfer member cleaning region" or is simply referred to as a "cleaning region".

In this embodiment, the above-described respective elements are aligned on a center(-line) basis so that substantial centers thereof with respect to the longitudinal direction are aligned with each other. For that reason, in this embodiment, a positional relationship between opposite end portions of each of the respective elements with respect to the longitudinal direction is such that the opposite end portions are substantially symmetrical with respect to the substantial center with respect to the longitudinal direction. Further, in this embodiment, between the respective elements, a relatively narrow longitudinal width falls within a relatively broad longitudinal width.

In view of development stability at the end portions with respect to the longitudinal direction, the longitudinal width of the developing region is set so as to be broader than the longitudinal width of the toner image forming region. Further, in order to remove the toner scattered from the end portions of the developing device 106 with respect to the longitudinal direction, the longitudinal width of the photosensitive member cleaning region is set so as to be broader than the longitudinal width of the developing region. Further, even when positional deviation of the intermediary transfer belt 101 with respect to the longitudinal direction due to meandering of the intermediary transfer belt 101 occurs, the longitudinal width of the intermediary transfer member cleaning region is set so as to be broader than the longitudinal width of the photosensitive member cleaning region so that the toner on the intermediary transfer belt 101 can be removed.

In such a case of a longitudinal arrangement, in the neighborhood of each of the end portions of the photosensitive member cleaning blade 108 with respect to the longitudinal direction and in the neighborhood of each of the end portions of the intermediary transfer member cleaning blade 102, there is a region in which as a lubricant, the toner or an external additive is hardly supplied to the associated cleaning blade. In this region a friction coefficient between the elastic blade 1 of the photosensitive member cleaning blade 108 and the photosensitive drum 103 and a friction coefficient between the elastic blade 1 of the intermediary transfer member cleaning blade 102 and the intermediary transfer belt 101 become high. In this embodiment, in each of the photosensitive member cleaning region and the intermediary transfer member cleaning region, a region outside the developing region is called a "high μ region".

Parts (a) and (b) of FIG. 3 are schematic views of a conventional cleaning blade 200. Part (c) of FIG. 3 is a schematic top (plan) view of the conventional cleaning blade 200 as viewed from a side opposite from a surface-to-be-cleaned (surface of the photosensitive drum 103, surface of the intermediary transfer belt 101) side. Further, part (b) of FIG. 3 is a schematic perspective view of the conventional cleaning blade 200 as viewed from a free end portion side where the cleaning blade contacts the surface-to-be-cleaned. The conventional cleaning blade 200 is constituted by including an elastic blade 201 and a supporting metal plate 202. Further, in the conventional cleaning blade 200, a free length of the elastic blade 201 is set so as to be substantially uniform in the longitudinal direction of the elastic blade 201. Incidentally, the "free length" of the elastic blade refers to a length, with respect to the short direction, of a supporting member provided in contact with or opposed to the surface of the cleaning blade and for regulating deformation of the elastic blade on the free end portion side or of a portion projected from the regulating member. In this embodiment, the free length of the elastic blade 201 is a length from a bonding surface between the elastic blade 201 and the supporting metal plate 202 to a free end of the elastic blade 201. That is, in this embodiment, the supporting metal plate 202 constitutes a regulating portion regulating the free length of the elastic blade 201.

FIG. 4 is a schematic view showing a deformation state of the conventional cleaning blade 200 in the high μ region. In the high μ region, a load exerted on the elastic blade 201 is large. For that reason, in the high μ region, by rotation of the image bearing member such as the photosensitive drum 103 or the intermediary transfer belt 101, the edge portion of the elastic blade 201 is largely drawn into a downstream side of the surface movement direction of the image bearing member. This causes occurrence of the blade turning-up. Accordingly, if the load in the high μ region can be released, it is possible to suppress the occurrence of the blade turning-up.

Parts (a) and (b) of FIG. 5 are schematic views of the photosensitive member cleaning blade 108 and the intermediary transfer member cleaning blade 102 in this embodiment. Incidentally, in this embodiment, as regards the photosensitive member cleaning blade 108 and the intermediary transfer member cleaning blade 102, settings such as longitudinal widths in the cleaning regions are different from each other in some instances, but general constitutions are substantially the same. Accordingly, the photosensitive member cleaning blade 108 and the intermediary transfer member cleaning blade 102 are simply referred collectively as a "cleaning blade 3" in some cases. Part (a) of FIG. 5 is a schematic top view in which the cleaning blade 3 is viewed from a side opposite from the surface-to-be-cleaned (the surface of the photosensitive drum 103 or the surface of the intermediary transfer belt 101) side. Further, part (b) of FIG. 5 is a schematic perspective view in which the cleaning blade 3 is viewed from a free end portion side on which the cleaning blade 3 contacts the surface-to-be-cleaned.

The cleaning blade 3 in this embodiment is constituted by including the elastic blade 1 and the supporting metal plate 2. Further, as regards the elastic blade 3 in this embodiment, a free length of the elastic blade 1 is changed with respect to the longitudinal direction of the elastic blade 1 depending on a shape of the supporting metal plate 2. Incidentally, in this embodiment, the free length of the elastic blade 1 is a length from a bonding surface between the elastic blade 1 and the supporting metal plate 2 to a free end of the elastic blade 1. That is, in this embodiment, the supporting metal plate 2 constitutes a regulating portion for regulating the free length of the elastic blade 1. Here, the free end of the elastic blade 1 may desirably extend along (in this embodiment, substantially parallel to) a direction substantially perpendicular to the surface movement direction of the image bearing member such as the photosensitive drum 103 or the intermediary transfer belt 101 from a viewpoint of a cleaning property. For that reason, in this embodiment, the free length of the elastic blade 1 is changed depending on the shape of the supporting metal plate 2.

Specifically, a free length L1 of the elastic blade 1 at a central portion with respect to the longitudinal direction and a free length L2 of the elastic blade 1 in a region of a predetermined width (longitudinal width) w in each of opposite end portions with respect to the longitudinal direction are set so as to satisfy a relationship of: L1<L2. Further, in this embodiment, this width w is set so that the width w is equal to or broader than a width (longitudinal width) of the high μ region. By this, in the high μ region, the load exerted on the elastic blade 1 can be released. Incidentally, in this embodiment, the region of the width w in which the free length of the elastic blade 1 is L2 is also referred to as a "long free length region". Further, in this embodiment, a region in which the free length of the elastic blade 1 is L1 is also referred to as a "short free length region". Further, in order to move effectively release the load, the free length L1 and the free length L2 may desirably be set so as to satisfy a relationship of: 1.2×L1≤L2. However, typically, the free length L1 and the free length L2 are set so as to satisfy a relationship of: L2≤1.46×L1. Incidentally, the shape of the supporting metal plate 2 is not limited to a shape shown in FIG. 5.

FIG. 6 is a schematic view showing a deformation state of the cleaning blade 3 in this embodiment in the high μ region. By making the free length of the elastic blade 1 in the high μ region long, the load exerted on the elastic blade 1 can be released. For that reason, the edge portion of the elastic blade 1 is prevented from being largely drawn into the downstream side of the surface movement direction of the image bearing member such as the photosensitive drum 103 or the intermediary transfer belt 101, so that the occurrence of the blade turning-up is suppressed.

However, when the free length of the elastic blade 1 is set long, a contact pressure of the elastic blade 1 to the image bearing member such as the photosensitive drum 103 or the intermediary transfer belt 101 lowers. For that reason, in the case where the width w is broad to the extent that the width w enters an inside of the toner image forming region depending on an image to be formed or the like, there is a possibility that improper cleaning (defective cleaning) occurs. Accordingly, the width w may desirably be set so that the width w is equal to or broader than the width of the high μ region and so that the width w does not enter the inside of the toner image forming region.

FIG. 7 is an illustration of longitudinal widths of respective portions relating to the cleaning blade 3 in this embodiment. Incidentally, an uppermost portion of FIG. 7 and a portion immediately lower than the uppermost portion of FIG. 7 are a schematic top view in which the cleaning blade 3 is viewed from the surface-to-be-cleaned (the surface of the photosensitive drum 3 or the surface of the intermediary transfer belt 101) side and a schematic top view in which the cleaning blade 3 is viewed from a side opposite from the surface-to-be-cleaned side, respectively. Here, a free length of the elastic blade 1 at a central portion with respect to the longitudinal direction is L2, and a free length of the elastic blade 1 in a region of a predetermined width w (long free length region) of the elastic blade 1 in an end portion with respect to the longitudinal direction is L2. At this time, in this embodiment, a relationship of the following formula is satisfied.

$$L1<L2$$

Further, the longitudinal width of the elastic blade 1 (cleaning region) is w1, the longitudinal width of the developing region is w2, and the longitudinal width of the toner image forming region is w3. Incidentally, for convenience, regions themselves of these longitudinal widths w, w1, w2, and w3 are described by adding symbols w, w1, w2, and w3 in some instances. In this case, a relationship of the following formula may desirably be satisfied.

$$w \geq (w1-w2)/2$$

Further, a relationship of the following formula may desirably be satisfied.

$$w \leq (w1-w3)/2$$

From these relationships, it can be said that a relationship of the following formula is satisfied.

$$(w-w2)/2 \leq w \leq (w1-w3)/2$$

Incidentally, in this embodiment, the respective elements are aligned on the center(-line) basis as described above, and therefore, the above-described relationships are satisfied, but at each of opposite end portions of the cleaning blade 3 with respect to the longitudinal direction, the following positional relationships may only be required to be satisfied. That is, with respect to the longitudinal direction, an inside end portion of the long free length region may desirably be positioned at the same position as or inside an end portion of the developing region w2 and be positioned at the same position as or outside an end portion of the toner image forming region w3. Further, an end portion of a short free length region w5 may desirably be positioned at the same position as or outside the end portion of the toner image forming region w3 and be positioned at the same position as or inside the end portion of the developing region w2. In this embodiment, the long free length region w in which the free length is L2 and is substantially uniform with respect to the longitudinal direction is provided. Further, in this embodiment, with respect to the longitudinal direction, the inside end portion of this long free length region w is positioned inside the end portion of the developing region w2 and outside the end portion of the toner image forming region w3. The long free length region w includes an associated extreme end portion of the elastic blade 1. Further, in this embodiment, the short free length region w5 in which the free length is L1 and is substantially uniform with respect to the longitudinal direction is provided. Further, in this embodiment, with respect to the longitudinal direction, the end portion of this short free length region w5 is positioned outside the end portion of the toner image forming region w3 and inside the end portion of the developing region w2. The short free length region w5 includes a central portion of the elastic blade 1. In this embodiment, the above-described long free length region w and the short free length region w5 are connected via a region in which the free length changes substantially rectilinearly. However, the long free length region w and the short free length region w5 may be directly connected to each other via a stepped portion of the free length.

3. Experiment Example

3-1. Experimental Example 1

A plurality of cleaning blades 3 different in value of the width w in the constitution of FIG. 5 (constitution common to this embodiment and the experimental example 1) were prepared and were used as the photosensitive member cleaning blades 108. Each of the photosensitive member cleaning blades 108 was mounted in the image forming apparatus 100, and a continuous sheet passing test was conducted, and then an effect of this embodiment was confirmed. As an image outputted in the continuous sheet passing test, a solid white image for which the blade turning-up is liable to occur was used. Further, in the constitution of this embodiment, as regards the photosensitive member cleaning blade 108, a width of the high μ region is 4 mm, a length from an end portion (extreme end portion) of the elastic blade 1 to an outside end portion of the toner image forming region with respect to the longitudinal direction is κ mm. Further, the free length L1 and the free length L2 were set at 8 mm and 9.6 mm, respectively, so that a relationship between the free length L1 and the free length L2 was set so as to satisfy: 1.2×L1≤L2. In the continuous sheet passing test, occurrence non-occurrence of the blade turning-up due to an increase in the number of sheets subjected to the continuous sheet passing test was checked. Further, a predetermined test image was formed during the continuous sheet passing test, and occurrence or non-occurrence of improper cleaning (slip-through the toner) was checked.

Results of the continuous sheet passing test are shown in parts (a) and (b) of FIG. 8. Part (a) of FIG. 8 is a table showing an occurrence status of the blade turning-up in the continuous sheet passing test. Further, part (b) of FIG. 8 is a table showing an occurrence status of the improper cleaning in the continuous sheet passing test. As shown in part (a) of FIG. 8, in the case where the width w was 0 mm, 2 mm, and 4 mm, the blade turning-up occurred during the continuous sheet passing test. On the other hand, in the case where the width w was 6 mm, 8 mm, and 10 mm, the blade turning-up did not occur and the continuous sheet passing test was ended. Further, as shown in part (b) of FIG. 8, in the case where the width w was 0 mm, 2 mm, 4 mm, and 6 mm, the improper cleaning did not occur during the continuous sheet passing test. On the other hand, in the case where the width w was 8 mm, slight improper cleaning occurred during the continuous sheet passing test, and in the case where the width w was 10 mm, the improper cleaning occurred during the continuous sheet passing test.

Thus, in the photosensitive member cleaning blade 108 having the constitution of FIG. 5, by setting the width w so that the width w is broader than the width of the high μ region and so that the width w does not enter the toner image forming region, it is possible to suppress the occurrence of the improper cleaning while suppressing the blade turning-up more effectively.

3-2. Experimental Example 2

A plurality of cleaning blades 3 different in value of the width w in the constitution of FIG. 5 (constitution common to this embodiment and the experimental example 1) were prepared and were used as the intermediary transfer member cleaning blades 102. Each of the intermediary transfer member cleaning blades 102 was mounted in the image forming apparatus 100, and a continuous sheet passing test was conducted, and then an effect of this embodiment was confirmed. As an image outputted in the continuous sheet passing test, a solid white image for which the blade turning-up is liable to occur was used. Further, in the constitution of this embodiment, as regards the intermediary transfer member cleaning blade 102, a width of the high μ region is 6 mm, a length from an end portion (extreme end portion) of the elastic blade 1 to an outside end portion of the toner image forming region with respect to the longitudinal direction is 10 mm. Further, the free length L1 and the free length L2 were set at 8 mm and 9.6 mm, respectively, so that a relationship between the free length L1 and the free length L2 was set so as to satisfy: 1.2×L1≤L2. In the continuous sheet passing test, occurrence non-occurrence of the blade turning-up due to an increase in the number of sheets subjected to the continuous sheet passing test was checked. Further, a predetermined test image was formed during the continuous sheet passing test, and occurrence or non-occurrence of improper cleaning (slip-through the toner) was checked.

Results of the continuous sheet passing test are shown in parts (a) and (b) of FIG. 9. Part (a) of FIG. 9 is a table showing an occurrence status of the blade turning-up in the continuous sheet passing test. Further, part (b) of FIG. 9 is a table showing an occurrence status of the improper cleaning in the continuous sheet passing test. As shown in part (a) of FIG. 9, in the case where the width w was 0 mm, 2 mm, 4 mm, and 6 mm, the blade turning-up occurred during the continuous sheet passing test. On the other hand, in the case where the width w was 8 mm and 10 mm, the blade turning-up did not occur and the continuous sheet passing test was ended. Further, as shown in part (b) of FIG. 9, in the case where the width w was 0 mm, 2 mm, 4 mm, 6 mm and 8 mm, the improper cleaning did not occur during the continuous sheet passing test. On the other hand, in the case where the width w was 8 mm, slight improper cleaning occurred during the continuous sheet passing test.

Thus, in the intermediary transfer member cleaning blade 102 having the constitution of FIG. 5, by setting the width w so that the width w is broader than the width of the high μ region and so that the width w does not enter the toner image forming region, it is possible to suppress the occurrence of the improper cleaning while suppressing the blade turning-up more effectively.

3-3. Experimental Example 3

A continuous sheet passing test was conducted similarly as in the experimental example 1 except that the free length L2 was set at 9.0 mm, and that a relationship between the free length L1 and the free length L2 was set so as to satisfy: 1.2×L1>L2. In the continuous sheet passing test, occurrence non-occurrence of the blade turning-up due to an increase in the number of sheets subjected to the continuous sheet passing test was checked.

A result of the continuous sheet passing test is shown in FIG. 10. FIG. 10 is a table showing an occurrence status of the blade turning-up in the continuous sheet passing test. As shown in FIG. 10, in all the cases where the width w was 0 mm, 2 mm, 4 mm, 6 mm, 8 mm, and 10 mm, the blade turning-up occurred during the continuous sheet passing test. This would be considered because the load was not able to be sufficiently released.

4. Modified Embodiment

A preferred form of the cleaning blade 3 in this embodiment was described using FIG. 7 and the like. As shown in FIG. 7, it is important that the free length is abruptly changed from the free length L2 in the high μ region to the free length L1 in the toner image forming region. However, this embodiment is not limited to a manner of the change in free length of the elastic blade as shown in FIG. 7, for example. As described later, it turned out that an effect similar to the above-described effect can be obtained by setting the free length L1 and the free length L2 in the following manner.

An average of the free length L1 of the elastic blade 1 in the toner image forming region is an average free length L1*a*. Further, an average of the free length L2 of the elastic blade 1 in the high μ region (outside the developing region) is an average free length L2*a*. At this time, similarly as described above, the average free length L1*a* and the average L2*a* are set so as to satisfy a relationship of: L1*a*<L2*a*. Further, similarly as described above, the average free length L1*a* and the average free length L2*a* may desirably be set so as to satisfy a relationship of: 1.2×L1*a*≤L2*a*. Further, it can be said that the average free lengths L1*a* and L2*a* may desirably satisfy a relationship of: L2*a*≤1.46×L1*a*. Here, a difference (absolute value) between the average free lengths L1*a* and L2*a* is ΔL (i.e., ΔL=L2*a*−L1*a*). At this time, an upper-limit value of the free length L1 of the elastic blade 1 in the toner image forming region may desirably be "average free length L1*a*)>(free length difference ΔL)×20%". That is, the free length L1 of the elastic blade 1 in the toner image forming region may desirably be "(average free length L1*a*)+(free length difference ΔL)×20%" or less. Further, a lower-limit value of the free length L2 of the experiment 1 in the high μ region may desirably be "(average free length L2*a*)−(free length difference ΔL)×20%". That is, the free length L2 of the elastic blade 1 in the high μ region may desirably be "(average free length L2*a*)−(free length difference ΔL)×20%" or more. Further, the upper-limit value of the free length L2 in the high μ region may desirably be "(average free length L2*a*)+(free length difference ΔL)×130%". That is, the free length L2 of the elastic blade 1 in the high μ region may desirably be "(average free length L2*a*)+(free length difference ΔL)×130%" or less.

Further, a free length of the elastic blade 1 in a region inside the developing region and outside the toner image forming region (this region is referred to as a fog region which is a non-image forming region in which fog toner from the developing device 106 is capable of being deposited on the elastic blade 1) is L3. At this time, the free length L3 may desirably be between the average free length L1*a* and the average free length L2*a*. That is, a relationship of: (average free length L1*a*)≤(free length L3)−(average free length L2*a*) may desirably be satisfied.

In this embodiment, as shown in FIG. 5, the end portion of the supporting metal plate 2 is provided with a slope so that the free length of the end portion of the elastic blade 1 gradually becomes long, so that a relationship of: (average free length L1*a*)<(free length L3)<(average free length L2*a*) is satisfied. By doing so, a risk of the improper cleaning due to abrupt change in free length is reduced.

FIG. 11 is an illustration for illustrating settings of the free lengths of the above-described elastic blade 1, in which an upper portion shows a relationship between the longitudinal widths of the respective portions and a lower portion shows a relationship between a longitudinal position and the free length of the elastic blade 1. When the above-described relationships with the free length difference ΔL are taken into consideration, as regards the free length L2 of the elastic blade 1 in the high μ region, relationships of the following formulas may desirably be satisfied.

$$L2a>1.2\times L1a$$

$$L2\geq 1.16\times L1a(\text{i.e., } L2\geq L2a-\Delta L\times 0.2)$$

$$L2\leq 1.46\times L1a(\text{i.e., } L2\leq L2a+\Delta L\times 1.3)$$

At a portion where the free length L2 exceeds a maximum in this range, there is a possibility that slip-through of the toner (improper cleaning) occurs. Further, at a portion where the free length L2 is below a minimum in this range, there is a possibility that the blade turning-up occurs.

Here, ΔL=L2*a*−L1*a* holds, and therefore, a relationship of: L2≥L1*a*+ΔL×0.8 may preferably be satisfied.

Further, when the above-described relationship with the free length difference ΔL is taken into consideration, as regards the free length L1 of the elastic blade 1 in the toner image forming region, a relationship of the following formula may desirably be satisfied.

$$L1\leq 1.04\times L1a(\text{i.e., } L1\leq L1a+\Delta L\times 0.2)$$

At a portion where the free length L1 exceeds a maximum in this range, the slip-through of the toner (improper cleaning) occurs.

Further, as described above, as regards the free length L3 in the region (fog region) inside the developing region and outside the toner image forming region, a relationship of the following formula may desirably be satisfied.

$$L1a\leq L3\leq L2a$$

By this, the free length of the elastic blade 1 can be abruptly changed from the free length L2 in the high μ region to the free length L1 in the toner image forming region, so that the blade turning-up and the occurrence of the improper cleaning can be effectively suppressed.

Parts (a) and (b) of FIG. 2 show results that a continuous sheet passing test similar to the above-described continuous sheet passing test was conducted using cleaning blades 3 in which the average free length L1*a* was 8 mm, the average free length L2*a* was 9.6 mm, and the width w was 6 mm and in which a maximum ("L1max") of the free length L1, and a minimum ("L2min") and a maximum ("L2max") of the free length L2 are changed as shown in FIG. 11. Part (a) of FIG. 12 shows an occurrence status (test result) of the blade turning-up, and part (b) of FIG. 12 shows an occurrence status (test result) of the slip-through of the toner (improper cleaning). In this embodiment, as a representative, the test results by the image forming apparatus 100 in which the cleaning blade 3 was mounted as the photosensitive member cleaning blade 108 are shown. The test results by the image forming apparatus 100 in which the cleaning blade 3 was mounted as the intermediary transfer member cleaning blade 102 are similar to those by the above-described image forming apparatus 100.

From parts (a) and (b) of FIG. 12, by setting the free length L1 and the free length L2 as described above in consideration of the relationships with the free length difference ΔL, it is understood that the occurrence of the improper cleaning can be suppressed while suppressing the blade turning-up.

As described above, according to this embodiment, it is possible to suppress the occurrence of the improper cleaning while suppressing the blade turning-up.

Embodiment 2

Next, another embodiment of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions and constitutions as those in the image forming apparatus of the embodiment 1, reference numerals or symbols which are the same as those in the image forming apparatus of the embodiment 1 are added and detailed description thereof will be omitted.

Parts (a) and (b) of FIG. 13 are schematic views of the cleaning blade 2 (the photosensitive member cleaning blade 108 or the intermediary transfer member cleaning blade 102) in this embodiment. Part (a) of FIG. 13 is a schematic top view in which the cleaning blade 3 is viewed from a side opposite from the surface-to-be-cleaned (the surface of the photosensitive drum 103 or the surface of the intermediary transfer belt 101) side. Further, part (b) of FIG. 13 is a schematic perspective view in which the cleaning blade 3 is viewed from a free end portion side on which the cleaning blade 3 contacts the surface-to-be-cleaned.

The cleaning blade 3 in this embodiment is constituted by an elastic blade 11, a supporting metal plate 12 as a supporting member, a rear metal plate 13 as a regulating member, and a spacer member 14 as a fixing member for fixing the rear metal plate 13 to the supporting metal plate 12. In the cleaning blade 3 in this embodiment, the elastic blade 11 is fixed to the supporting metal plate by bonding, but a part of a surface thereof on the image bearing member side such as the photosensitive drum 103 side or the intermediary transfer belt 101 side is bonded to the supporting metal plate 12. Further, in the cleaning blade 3 in this embodiment, the free length of the elastic blade 11 is regulated by the rear metal plate 13 superposed on the surface of the elastic blade 11 from a side opposite from the supporting metal plate 12. That is, in this embodiment, the rear metal plate 13 constitutes a regulating portion for regulating the free length of the elastic blade 11. This rear metal plate 13 is held by the spacer member 14 with a predetermined distance from the elastic blade 11. Further, in this embodiment, by a shape of this rear metal plate 13, the free length of the elastic blade 11 can be changed with respect to the longitudinal direction of the elastic blade 11. Incidentally, in this embodiment, the free length of the elastic blade 11 is a length, with respect to the short direction, of a portion of the elastic blade 11 projected from a superposed portion between the elastic blade 11 and the rear metal plate 13 in the case where the cleaning blade 3 is viewed in a thickness direction of the elastic blade 11.

As described above, the present invention is also applicable to the cleaning blade 3 as in this embodiment, and an effect similar to the effect in the case of the constitution of the embodiment 1 can be obtained.

Embodiment 3

Next, another embodiment of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions and constitutions as those in the image forming apparatus of the embodiment 1, reference numerals or symbols which are the same as those in the image forming apparatus of the embodiment 1 are added and detailed description thereof will be omitted.

Parts (a) and (b) of FIG. 13 are schematic views of the cleaning blade 2 (the photosensitive member cleaning blade 108 or the intermediary transfer member cleaning blade 102) in this embodiment. Part (a) of FIG. 14 is a schematic side view in which the cleaning blade 3 is viewed along the longitudinal direction of the cleaning blade 3. Further, part (b) of FIG. 14 is a schematic top view in which the cleaning blade 3 is viewed from a side opposite from the surface-to-be-cleaned (the surface of the photosensitive drum 103 or the surface of the intermediary transfer belt 101) side.

In this embodiment, the cleaning blade 3 with the constitution of FIGS. 5 and 7 in the embodiment 1 was used. In addition, in order to impart a resistance against the blade turning-up to the elastic blade 1, the elastic blade 1 was subjected to curing treatment as shown in parts (a) and (b) of FIG. 14. In this embodiment, as shown in parts (a) and (b) of FIG. 14, the elastic blade 1 was impregnated with an isocianate compound at opposite end portions with respect to the longitudinal direction thereof, so that the curing treatment was performed. As a method of forming a treated portion (curing-treated portion, isocianate-treated portion) at each of the opposite end portions of the elastic blade 1 with respect to the longitudinal direction, for example, it is possible to cite a method including the following steps:

(1) a step of bringing the isocianate compound into contact with each of the opposite end portions, with respect to the longitudinal direction, of a contact portion of the elastic blade 1 with the image bearing member such as the photosensitive drum 103 or the intermediary transfer belt 101, (2) a step of impregnating the elastic blade 1 with the isocianate compound by leading the isocianate compound standing in a state in which the isocianate compound is contacted to the surface of the cleaning blade 1, (3) a step of removing the isocianate compound remaining on the surface of the cleaning blade 1 after the impregnation, and (4) a step of forming the treated portion by reacting the isocianate compound, with which the elastic blade 1 is impregnated, with a material forming the elastic blade 1.

That is, in the steps (1) and (2), a free end of the elastic blade 1 is impregnated with the isocianate compound in an appropriate amount at each of the longitudinal end portions of a side surface 1*x* of the elastic blade 1 which is a contact surface of the elastic blade 1 with the image bearing member such as the photosensitive drum 103 or the intermediary transfer belt 101. Incidentally, the side surface 1*x* is a surface, of surfaces of the elastic blade 1 formed by portions defined by the longitudinal direction and a short(-side) direction, on the image bearing member side such as the photosensitive drum 103 side or the intermediary transfer belt 101 side. In the step (3), excessive isocianate compound is removed from the surface of the elastic blade 1, and in the step (4), the treated portion (curing-treated portion, isocianate-treated portion) 1*a* is formed by reaction of the isocianate compound. In the step (4), it would be considered that an allophanate bond is formed by reaction of the isocianate compound with a polyurethane resin forming the elastic blade 1 and then is cured, so that the treated portion 1*a* with high hardness is formed. The treated portion 1*a* is provided on each of one end side and the other end side of the elastic blade 1 with respect to the longitudinal direction. That is, in the urethane resin forming the elastic blade 1, urethane bond having active hydrogen exists. Then, in the step (4), it would be considered that the treated portion 1*a* is formed by forming the allophanate bond through reaction of this urethane bond with the isocianate compound with which the elastic blade 1 is impregnated. The elastic blade 1 is impregnated with the isocianate compound to a depth of 100 μm to 500 μm in a depth direction. Further, it would be considered that oligomerization reaction due to reaction between isocianate compounds (for example, carbodiimide reaction, isocianate reaction, and the like) also progresses simultaneously, and contributes to formation of the treated portion 1*a*. As a result, it would be considered that hardness of the treated portion 1*a* is improved and friction coefficient of the elastic blade 1 against the surface-to-be-cleaned is alleviated, so that the blade turning-up can be suppressed. Dynamic hardness of the treated portion 1*a* may preferably be 0.17 mN/(μm×μm) or more from a viewpoint of suppression of the blade turning-up. The dynamic hardness can be acquired by being measured using a measuring machine ("Dynamic Ultra Micro Hardness Tester", manufactured by Shimadzu Corp.).

In this embodiment, as the isocianate compound with which the elastic blade 1 is impregnated, it is possible to use an isocyanate compound having one isocyanate group in (one) molecule and an isocianate compound having two or more isocianate groups in molecule. As the isocyanate compound having one is isocyanate group in molecule, it is possible to use an aliphatic monoisocyanate such as octadecy isocyanate (ODI), an aromatic monoisocyanate, and the like. As the isocyanate compound, with which the elastic blade 1 is impregnated, having two or more isocyanate groups in molecule, it is possible to use 2,4-trylene diisocyanate, 2,6-trylene diisocyanate, 4,4'-diphenylmethane diisocyanate (MDI), m-phenylene diisocyanate, tetramethylene diisocyanate, hexamethylene diisocyanate, and the like. In this embodiment, in order to accelerate the reaction of the isocyanate compound, in addition to the isocyanate compound, the polyurethane resin may also be impregnated with a catalyst.

The impregnation of the elastic blade 1 with the isocyanate compound can also be performed by using, e.g., a method in which a fibrous member or a porous member is impregnated with the isocyanate compound and then is applied onto the elastic blade 1, a spray coating method, or the like method. By the above-described manner, the elastic blade 1 is impregnated with the isocianate compound for a predetermined time. A treatment time can be changed depending on a constitution of the image forming apparatus 100 or a member to which the elastic blade 1 is contacted, and an optimum treatment time and an optimum treatment range may also be set for the photosensitive member cleaning blade 108 and the intermediary transfer member cleaning blade 102 separately from each other.

In the step (3), the isocianate compound remaining on the surface of the elastic blade 1 is wiped up using a solvent capable of dissolving the isocianate compound. After through the above-described steps, in the step (4), the isocianate compound with which the elastic blade 1 is impregnated forms the allophanate bond by reaction, or most of the isocianate compound is consumed by reaction with water (moisture) in the air, so that a white opaque high-hardness treated layer is formed.

The treated portion 1*a* prepared by the above-described steps swells in a thickness direction in some cases. When the treated portion 1*a* swelled, a stepped portion is formed at a boundary between the treated portion 1*a* and a surface layer on a central side where the isocianate treatment is not performed, so that there is a liability that the toner slips through the stepped portion. For that reason, an application (coating) condition in which the stepped portion is suppressed as can as possible is desired. Incidentally, a boundary stepped portion, i.e., a difference in thickness of the elastic blade 1 is capable of effectively suppressing the slip-through of the toner when is 12 μm or less, for example, preferably 10 μm or less.

Further, in this embodiment, the isocianate treatment surface was the side surface 1*x*, but a similar effect can also be obtained even by swelling an end surface 1*y* as the treated surface in a free length direction. Incidentally, the end surface 1*y* is a free end-side surface, of surfaces formed by portions defined by a thickness direction and the longitudinal direction of the elastic blade 1, contacting the image bearing member side such as the photosensitive drum 103 side or the intermediary transfer belt 101 side.

Here, a plurality of cleaning blades 3 different in width (longitudinal width) w4 of the treated portion 1*a* of the elastic blade 1 and width w in the region (long free length region) in which the free length is L2, in the constitution of FIG. 14 (common constitution to this embodiment) were prepared. Then, each of the cleaning blades 3 was mounted in the image forming apparatus 100 and was subjected to a continuous sheet passing test, so that an effect of this embodiment was confirmed. As an image outputted in the continuous sheet passing test, a solid white image for which the blade turning-up is liable to occur was used. Further, in the constitution of this embodiment, as regards the photosensitive member cleaning blade 108, a width of the high μ region is 4 mm, and a length from an end portion (extreme end portion) of the elastic blade 1 to an outside end portion of the toner image forming region is 8 mm. Further, the free length L1 and the free length L2 were set at 8 mm and 9.6 mm, respectively. Further, as a more severe condition, in order to confirm an effect against the blade turning-up, a contact angle of the photosensitive member cleaning blade 108 to the photosensitive drum 103 was set at 25°. Incidentally, the width w4 is a width of a region in which the isocianate treatment is performed on a ridge line formed by the side surface 1*x* and the end surface 1*y* of the elastic blade 1. In the continuous sheet passing test, occurrence or non-occurrence of the blade turning-up due to an increase in the number of sheets subjected to the continuous sheet passing test was checked. Further, during the continuous sheet passing test, a predetermined test image was formed and then occurrence or non-occurrence of improper cleaning (slip-through of the toner) was checked. Further, during the continuous sheet passing test, occurrence or non-occurrence of local abrasion of a portion corresponding to the treated portion 1*a* of the surface of the photosensitive drum 103 was checked.

FIG. 15 is an illustration of longitudinal widths of respective portions relating to the cleaning blade 3 in this embodiment.

Incidentally, an uppermost portion and a portion immediately lower than the uppermost portion of FIG. 15 are schematic top view of the cleaning blade 3 as viewed from the surface-to-be-cleaned (the surface of the photosensitive drum 103 or the surface of the intermediary transfer belt 101) side and a schematic top view of the cleaning blade 3 as viewed from a side opposite from the surface-to-be-cleaned (the surface of the photosensitive drum 3 or the surface of the intermediary transfer belt 101) side, respectively. In FIG. 15, a positional relationship between the longitudinal width w1 of the elastic blade 1 (cleaning region), the longitudinal width w2 of the developing region, the longitudinal width w3 of the toner image forming region, and the width w4 of the treated portion 1*a* is shown.

A result of the continuous sheet passing test is shown in parts (a), (b), and (c) of FIG. 16. Part (a) of FIG. 16 is a table showing an occurrence status of the blade turning-up in the continuous sheet passing test. Part (b) of FIG. 16 is a table showing an occurrence status of the improper cleaning in the continuous sheet passing test. Part (c) of FIG. 16 is a table showing an occurrence status of the local abrasion of the photosensitive drum 103 at the longitudinal end portions in the continuous sheet passing test.

As shown in part (a) of FIG. 16, in the case where the width w4 of the treated portion 1*a* was 0 mm, i.e., in the case where the curing treatment was not performed, the following result was obtained. That is, in the case where the width w was 0 mm, 2 mm, 4 mm, and 6 mm, the blade turning-up occurred during the continuous sheet passing test, and in the case where the width w was 8 mm and 10 mm, the continuous sheet passing test was ended without causing the occurrence of the blade turning-up. Further, in the case where the width w4 of the treated portion 1*a* was 2 mm, the following result was obtained. That is, in the case where the width w was 0 mm and 2 mm, the blade turning-up occurred during the continuous sheet passing test, and in the case where the width w was 4 mm, 6 mm, 8 mm, and 10 mm, the continuous sheet passing test was ended without causing the blade turning-up. In the case where the width w4 of the treated portion 1*a* is 4 mm, 6 mm, 8 mm, and 10 mm, in all the cases where the width w was 0 mm, 2 mm, 4 mm, 6 mm, 8 mm, and 10 mm, the continuous sheet passing test was ended without causing the blade turning-up.

Further, as shown in part (b) of FIG. 16, in the case where the width w4 of the treated portion 1*a* was 0 mm, 2 mm, 4 mm, and 6 mm, the following result was obtained. That is, in the case where the width w was 0 mm, 2 mm, 4 mm, and 6 mm, the improper cleaning did not occur during the continuous sheet passing test. Further, in the case where the width w was 8 mm, slight improper cleaning occurred during the continuous sheet passing test. Further, in the case where the width w was 10 mm, the improper cleaning occurred during the continuous sheet passing test. Further, in the case where the width w4 of the treated portion 1*a* was 8 mm and 10 mm, the following result was obtained. That is, in the case where the width w was 0 mm, 2 mm, 4 mm, 6 mm, and 8 mm, the slight improper cleaning occurred during the continuous sheet passing test. Further, in the case where the width w was 10 mm, the improper cleaning occurred during the continuous sheet passing test.

Further, as shown in part (c) of FIG. 16, in the case where the width w4 of the treated portion 1*a* was 0 mm and 2 mm, in all the cases where the width w is 0 mm, 2 mm, 4 mm, 6 mm, 8 mm, and 10 mm, the local abrasion of the photosensitive drum 103 at the longitudinal end portions did not occur. Further, in the case where the width w4 of the treated portion 1*a* was 4 mm, the following result was obtained. That is, in the case where the width w was 0 mm, 2 mm, and 4 mm, the local abrasion occurred at the longitudinal end portions of the photosensitive drum 103, so that a vertical stripe-shaped image defect occurred. Further, in the case where the width w was 6 mm, 8 mm, and 10 mm, the local abrasion did not occur at the longitudinal end portions of the photosensitive drum 103. Further, in the case where the width w4 of the treated portion 1*a* was 6 mm, 8 mm, and 10 mm, in all the cases where the width w was 0 mm, 2 mm, 4 mm, 6 mm, 8 mm, and 10 mm, the local abrasion occurred at the longitudinal end portions of the photosensitive drum 103, so that the vertical stripe-shaped image defect occurred.

A phenomenon that the photosensitive drum 103 is locally abraded would be considered to occur due to abrasion (wearing) of the photosensitive drum 103 at higher contact pressure by the hardened elastic blade 1 via the developer as an abrasive when the treated portion 1*a* enters the width w2 of the developing region. As is understood from the above-described result, by setting the treated portion 1*a* on an outside of the width w2 of the developing region, the local abrasion of the photosensitive drum 103 an be suppressed. The contact pressure is alleviated by setting the free length L2 in the range of the treated portion 1*a* so as to be longer than the free length L1 at the central portion, the local abrasion of the photosensitive drum 103 can be suppressed more effectively.

Incidentally, as described above, in the case of the photosensitive member cleaning blade 108, depending on setting of the width w4 of the treated portion 1*a*, a degree of the abrasion of the photosensitive drum 103 at a portion opposing the treated portion 1*a* at each of the longitudinal end portions of the elastic blade 1 becomes excessive in some instances. Also, in the case of the intermediary transfer member cleaning blade 102, similarly, depending on the setting of the width w4 of the treated portion 1*a*, there is a possibility that the abrasion of the intermediary transfer belt 101 at a portion opposing the treated portion 1*a* at each of the longitudinal end portions of the elastic blade 1 becomes problematic. For that reason, similarly as described above, by setting the width w4 of the treated portion 1*a*, the local abrasion of the intermediary transfer belt 101 can be suppressed.

As described above, as regards the setting of the width w4 of the treated portion 1*a*, the following can be said. That is, the free length of the elastic blade 1 at a central portion with respect to the longitudinal direction is L1, and the free length of the elastic blade 1 in a region (long free length region) with a predetermined width in each of opposite end portions with respect to the longitudinal direction is L2. At this time, the free lengths L1 and 12 are set so as to satisfy a relationship of L1<L2. Further, the longitudinal width of the elastic blade 1 (cleaning region) is w1, the longitudinal width of the developing region is w2, the longitudinal width of the toner image forming region is w3, and the width of the treated portion 1*a* is w4. At this time, setting may desirably be made so as to satisfy a relationship of the following formula.

$$w4<(w1-w2)/2$$

Incidentally, in this embodiment, the respective elements are aligned on the center(-line) basis as described above, and therefore, the relationship of the above-described formula is satisfied, but the following may only be required at each of the opposite end portions of the cleaning blade 3 with respect to the longitudinal direction. That is, with respect to the longitudinal direction, an inside end portion of the treated portion 1*a* is positioned outside the end portion of the developing region w2. This treated portion 1*a* includes an extreme end portion of the elastic blade 1. By this, it is possible to suppress occurrence of the local abrasion of the photosensitive drum 103 or the like at the longitudinal end portion.

Further, when the setting of the width w described in the embodiment 1 is taken into consideration, it can be said that the setting may desirably be made so as to satisfy a relationship of the following formula.

$$w4<(w1-w2)/2\leq(w1-w3)/2$$

By this, it is possible to suppress the occurrence of the local abrasion of the photosensitive drum 103 or the like at the longitudinal end portion while effectively suppressing the blade turning-up and the improper cleaning.

As described above, according to this embodiment, the occurrence of the local abrasion of the photosensitive drum 103 or the like at the longitudinal end portion can be suppressed while effectively suppressing the blade turning-up and the improper cleaning.

Embodiment 4

Next, another embodiment of the present invention will be described. Basic constitutions and operations of an image forming apparatus of this embodiment are the same as those of the image forming apparatus of the embodiment 1. Accordingly, in the image forming apparatus of this embodiment, elements having the same or corresponding functions or considerations as those in the image forming apparatus of the embodiment 1 are represented by the same reference numerals or symbols as those in the image forming apparatus of the embodiment 1 and will be omitted from detailed description.

In this embodiment, a modified example of the setting of the free length of the elastic blade 1 in consideration of also the influence of electric discharge by the charging roller 104 and the secondary transfer roller 111 as a contact member which contacts the image bearing member and to which a voltage is applied will be described.

1. Blade Turning-Up

Parts (a) and (b) of FIG. 17 are illustrations of a longitudinal arrangement of principal elements of the image forming apparatus 100. Part (a) of FIG. 17 is the illustration of the longitudinal arrangement relating to the photosensitive member cleaning blade 108, and part (b) of FIG. 17 is the longitudinal arrangement relating to the intermediary transfer member cleaning blade 102. Incidentally, the longitudinal width of the developing device 16, the longitudinal width of the photosensitive member cleaning blade 108, and the longitudinal width of the intermediary transfer member cleaning blade 102 are the widths of the developing region, the photosensitive member cleaning region, and the intermediary transfer member cleaning region, respectively, as described in the embodiment 1. The longitudinal width of the charging roller 104 refers to a width of a region (contact region between the charging roller 104 and the photosensitive drum 103) with respect to the longitudinal direction, in which the charging roller 104 is capable of electrically charging the photosensitive drum 103. Further, the longitudinal width of the secondary transfer roller 111 refers to a width of a region (contact region between the secondary transfer roller 111 and the intermediary transfer belt 101) with respect to the longitudinal direction, in which the secondary transfer roller 111 is capable of applying a voltage to the intermediary transfer belt 101. In this embodiment, the above-described respective elements are aligned on the center(-line) basis so that substantially longitudinal centers of the elements are aligned with each other.

As shown in part (a) of FIG. 17, in order to suppress deposition of the developer onto a non-charge portion of the photosensitive drum 103, the longitudinal width of the charging roller 104 is set broader than the longitudinal width of the developing region. Further, the longitudinal width of the photosensitive member cleaning region is set broader than the longitudinal width of the charging roller 104 so that an electric discharge product by the charging roller 104 can be removed.

Further, as shown in part (b) of FIG. 17, the longitudinal width of the secondary transfer roller 111 is set broader than the longitudinal width of the developing region so that the toner on the intermediary transfer belt 101 can be secondary-transferred even when positional deviation with respect to the longitudinal direction by meandering of the intermediary transfer belt 101 occurs. Further, the longitudinal width of the intermediary transfer member cleaning is set broader than the longitudinal width of the secondary transfer roller 111 so that the electric discharge product by the charging roller 104 can be removed.

In the case of such a longitudinal arrangement, the following region exists in the neighborhood of the longitudinal end portions of the photosensitive member cleaning blade 108 and in the neighborhood of the longitudinal end portions of the intermediary transfer member cleaning blade 102. That is, the region is such a region that the toner and an external additive which constitute a lubricant are hardly supplied and that is influenced by the electric discharge of the charging roller 104 or the secondary transfer roller 111. In this region, a friction coefficient between the elastic blade 1 of the photosensitive member cleaning blade 108 and the photosensitive drum 103 and a friction coefficient with the elastic blade 1 of the intermediary transfer member cleaning blade 102 and the intermediary transfer belt 101 become high. In this embodiment, a region, of the photosensitive member cleaning region, outside the developing region and inside the longitudinal width of the charging roller 104 and a region, of the intermediary transfer member cleaning region, outside the developing region and inside the longitudinal width of the secondary transfer roller 111 are referred to as "high μ regions".

FIG. 18 is a schematic view showing a deformation state of the conventional cleaning blade 200 (FIG. 3) in the high μ region. In the high μ region, a load exerted on the elastic blade 201 is large. For that reason, in the high μ region, by rotation of the image bearing member such as the photosensitive drum 103 and the intermediary transfer belt 101, the edge portion of the elastic blade 201 is largely drawn into a downstream side of the surface movement direction of the image bearing member. This causes occurrence of the blade turning-up. Accordingly, if the load in the high μ region can be released, the occurrence of the blade turning-up can be suppressed.

Parts (a) and (b) of FIG. 19 are schematic views of the photosensitive member cleaning blade 108 or the intermediary transfer member cleaning blade 108 in this embodiment. Incidentally, in this embodiment, the photosensitive member cleaning blade 108 and the intermediary transfer member cleaning blade 102 are different in setting of the longitudinal width of the cleaning region or the like in some instances, but general constitutions thereof are substantially the same. Accordingly, the photosensitive member cleaning blade 108 and the intermediary transfer member cleaning blade 102 are simply referred collectively as a "cleaning blade 3" in some instances. Part (a) of FIG. 19 is a schematic top view of the cleaning blade 3 as viewed from a side opposite from the surface-to-be-cleaned (the surface of the photosensitive drum 103 or the surface of the intermediary transfer belt 101) side. Further, part (b) of FIG. 19 is a schematic perspective view of the cleaning blade 3 as viewed from a free end portion side where the cleaning blade 3 contacts the surface-to-be-cleaned.

The cleaning blade 3 in this embodiment is constituted by including the elastic blade 1 and the supporting metal plate 2. Further, in the cleaning blade 3 in this embodiment, depending on a shape of the supporting metal plate 2, a free length of the elastic blade 1 is changed with respect to the longitudinal direction of the elastic blade 1. Incidentally, in this embodiment, the free length of the elastic blade 1 is a length from a bonding surface between the elastic blade 1 and the supporting metal plate 2 to a free end of the elastic blade 1.

Specifically, in this embodiment, the setting is made in the following manner. That is, a free length of the elastic blade 1 in a first region with a predetermined width (longitudinal width) w11 including a longitudinal central portion is L11. Further, a free length of the elastic blade 1 in a third region with a predetermined width (longitudinal width) w13 including a longitudinal end portion (extreme end portion) is L13. Further, a free length of the elastic blade 1 in a second region with a predetermined width (longitudinal width) w12 adjacent to the first region and the third region is L12. At this time, in this embodiment, the free lengths L11, L12 and L13 are set so as to satisfy a relationship of: L11<L12<L13. Incidentally, for convenience, the regions themselves with these widths w11, w12, and w13 are called by adding the symbols w11, w12, and w13. In this embodiment, the free length of the elastic blade 1 is set at a substantially uniform value L11 in the first region w11, at a substantially uniform value L13 in the third region w13, and at a substantially uniform value L12 in the second region w12. Thus, in this embodiment, the elastic blade 1 includes three regions consisting of the regions w11, w12, and w13 from the central portion to the end portion with respect to the longitudinal direction, and in the regions w11, w12, and w13, the free lengths are the substantially uniform free lengths L11, L12, and L13, respectively. Here, the second region w12 is a region corresponding to the high μ region. Further, the free lengths L11, L12, and L13 are set so as to satisfy the relationship of: L11<L12<L13. Incidentally, the shape of the supporting metal plate 2 is not limited to the shape shown in FIG. 19.

FIG. 20 is a schematic view showing a deformation state of the cleaning blade 3 in this embodiment in the high μ region. By making the free length L12 of the elastic blade 1 in the high μ region long, the load exerted on the elastic blade 1 can be released. Further, by making the free length L13 of the elastic blade 1 in the longitudinal end portion long, the load exerted on the elastic blade 1 can be released more effectively. For that reason, the edge portion of the elastic blade 1 is not largely drawn into the downstream side of the surface movement direction of the image bearing member such as the photosensitive drum 103 and the intermediary transfer belt 101, so that the occurrence of the blade turning-up is suppressed.

2. Improper Cleaning

On the other hand, in a region in which the free length is made long, a contact pressure of the elastic blade 1 to the image bearing member such as the photosensitive drum 103 or the intermediary transfer belt 101 lowers. As is apparent from FIGS. 17 and 19, the toner is not supplied to the region w13, and therefore, the improper cleaning does not occur. However, to the region w12, the toner or the like scattered from the end portion of the developing device 106 is supplied. Accordingly, when the contact pressure in the neighborhood of a boundary between the region w12 and the region w11 excessively lowers, there is a possibility that the improper cleaning occurs.

FIG. 21 is a graph showing a contact pressure distribution in the neighborhood of the longitudinal end portion of the elastic blade 1. In the case where each of the free lengths L11, L12, and L13 is 8 mm, pressure concentration at the end portion of the elastic blade 1 and pressure lowering in the neighborhood thereof with the pressure concentration occurs. In the case where the free length L11 is 8 mm and each of the free lengths L12 and L13 is 9 mm, to this result, pressure lowering due to the increased free length is added. In the case where the free length L11 is 8 mm and each of the free lengths L12 and L13 is 10 mm, the pressure lowering becomes further conspicuous, so that considerable pressure lowering occurs in the neighborhood of a boundary between the region w12 and the region w11. On the other hand, in the case where the free length L11 is 8 mm, the free length L12 is 9 mm, and the free length L13 is 10 mm, compared with the case where the free length L11 is 8 mm and each of the free lengths 12 and L13 is 9 mm, the contact pressure in the neighborhood of the region w13 lowers, but the pressure lowering substantially does not occur in the neighborhood of a boundary between the region w12 and the region w11.

Accordingly, in the constitution in which the free length L11 is 8 mm, the free length L12 is 9 mm, and the free length L13 is 10 mm, it would be considered that it is possible to suppress the occurrence of the improper cleaning by preventing the pressure lowering in the neighborhood at the boundary between the region w12 and the region w11 while suppressing the occurrence of the blade turning-up by releasing the load in the high μ region (region w12). However, the present invention is not limited to the above-described specific values.

3. EXPERIMENTAL EXAMPLES

3-1. Experimental Example 4

In a common constitution to this embodiment, a plurality of cleaning blades 3 different in values of the free lengths L11, L12, and L13 were prepared, and each of the cleaning blades 3 was mounted as the photosensitive member cleaning blade 108 in the image forming apparatus 100 and was subjected to a continuous sheet passing test, and then an effect of this embodiment was confirmed. In the continuous sheet passing test, as an image to be outputted, the solid white image for which the blade turning-up is liable to occur was used. As shown in part (a) of FIG. 17 and part (a) of FIG. 19, the region w11 is the region corresponding to the developing region, the region w12 is the high μ region corresponding to the outside of the developing region and inside of the longitudinal width of the charging roller 104, and the region w13 is the region corresponding to the outside of the longitudinal width of the charging roller 104. In the continuous sheet passing test, the occurrence or non-occurrence of the blade turning-up due to an increase in the number of sheets subjected to the continuous sheet passing test was checked. Further, during the continuous sheet passing test, a predetermined test image was formed, and then the occurrence or non-occurrence of the improper cleaning (slip-through of the toner) was checked.

Results of this continuous sheet passing test are shown in parts (a) and (b) of FIG. 22. Pat (a) of FIG. 22 is a table showing an occurrence status of the blade turning-up in the continuous sheet passing test. Part (b) of FIG. 22 is a table showing an occurrence status of the improper cleaning in the continuous sheet passing test. In the case where each of the free lengths L11, L12, and L13 was 8 mm, the blade turning-up occurred during the continuous sheet passing test, but the improper cleaning did not occur during the continuous sheet passing test. Also, in the case where the free length L11 was 8 mm and each of the free lengths L12 and L13 was 9 mm, similarly, the blade turning-up occurred during the continuous sheet passing test, but the improper cleaning did not occur during the continuous sheet passing test. Here, the number of sheets subjected to the continuous sheet passing test was larger in the case where the free length L11 is 8 mm and each of the free lengths L12 and L13 is 9 mm than in the case where each of the free lengths L11, L12, and L13 *was* 8 mm. On the other hand, in the case where the free length L11 was 8 mm, the free length L12 was 9 mm, and the free length L13 was 10 mm, neither the blade turning-up nor the improper cleaning occurred. Further, in the case where the free length L11 was 8 mm and each of the free lengths L12 and L13 was 10 mm, the blade turning-up did not occur, but the improper cleaning occurred in the latter half of the continuous sheet passing test.

Thus, in the photosensitive member cleaning blade 108, the free lengths L11, L12, and L13 in the regions w11, w12, and w13 are set so as to satisfy the relationship of: L11<L12<L13, the occurrence of the improper cleaning can be suppressed while suppressing the blade turning-up.

3-2. Experimental Example 5

In a common constitution to this embodiment, a plurality of cleaning blades 3 different in values of the free lengths L11, L12, and L13 were prepared, and each of the cleaning blades 3 was mounted as the intermediary transfer member cleaning blade 102 in the image forming apparatus 100 and was subjected to a continuous sheet passing test, and then an effect of this embodiment was confirmed. In the continuous sheet passing test, as an image to be outputted, the solid white image for which the blade turning-up is liable to occur was used. As shown in part (b) of FIG. 17 and part (a) of FIG. 19, the region w11 is the region corresponding to the developing region, the region w12 is the high μ region corresponding to the outside of the developing region and inside of the longitudinal width of the secondary transfer roller 111, and the region w13 is the region corresponding to the outside of the longitudinal width of the secondary transfer roller 111. In the continuous sheet passing test, the occurrence or non-occurrence of the blade turning-up due to an increase in the number of sheets subjected to the continuous sheet passing test was checked. Further, during the continuous sheet passing test, a predetermined test image was formed, and then the occurrence or non-occurrence of the improper cleaning (slip-through of the toner) was checked.

Results of this continuous sheet passing test are shown in parts (a) and (b) of FIG. 23. Part (a) of FIG. 23 is a table showing an occurrence status of the blade turning-up in the continuous sheet passing test. Part (b) of FIG. 23 is a table showing an occurrence status of the improper cleaning in the continuous sheet passing test. In the case where each of the free lengths L11, L12, and L13 was 8 mm, the blade turning-up occurred during the continuous sheet passing test, but the improper cleaning did not occur during the continuous sheet passing test. Also, in the case where the free length L11 was 8 mm and each of the free lengths L12 and L13 was 9 mm, similarly, the blade turning-up occurred during the continuous sheet passing test, but the improper cleaning did not occur during the continuous sheet passing test. Here, the number of sheets subjected to the continuous sheet passing test was larger in the case where the free length L11 is 8 mm and each of the free lengths L12 and L13 is 9 mm than in the case where each of the free lengths L11, L12, and L13 was 8 mm. On the other hand, in the case where the free length L11 was 8 mm, the free length L12 was 9 mm, and the free length L13 was 10 mm, neither the blade turning-up nor the improper cleaning occurred. Further, in the case where the free length L11 was 8 mm and each of the free lengths L12 and L13 was 10 mm, the blade turning-up did not occur, but the improper cleaning occurred in the latter half of the continuous sheet passing test.

Thus, in the intermediary transfer member cleaning blade 102, the free lengths L11, L12, and L13 in the regions w11, w12, and w13 are set so as to satisfy the relationship of: L11<L12<L13, the occurrence of the improper cleaning can be suppressed while suppressing the blade turning-up.

As described above, it is desirable that the first region w11 is the region corresponding to the developing region, the second region w12 is the region corresponding to the outside of the developing region and inside of the longitudinal width of the charging roller 104 (or the secondary transfer roller 111) with respect to the longitudinal direction. However, similarly as described in the modified embodiment of the embodiment 1, the free lengths L11, L12, and L13 in the regions w11, w12, and w13 are not limited to substantially uniform lengths. That is, similarly as in the modified embodiment of the embodiment 1, the average of the free length L11 in the developing region is defined as the average free length L11*a*, the average of the free length L12 in the region outside of the developing region and isocianate of the longitudinal width of the charging roller 104 (or the secondary transfer roller 111) is defined as the average free length L12*a*, and average of the free length L13 in the region outside the longitudinal width of the charging roller 104 (or the secondary transfer roller 111) is defined as the average free length L13*a*. At this time, these average free lengths may only be required to be set so as to satisfy the relationship of: L11*a*<L12*a*<L13*a*.

Incidentally, the cleaning blade 3 can be constituted so as to satisfy the condition described in this embodiment while satisfying the condition described in the embodiment 1.

Other Embodiments

As described above, the present invention was described based on specific embodiments, but the present invention is not limited to the above-described embodiments.

For example, the constitution described in the embodiment 2 may be applied to the constitutions of the embodiments 3 and 4. Further, the constitution described in the embodiment 3 may be applied to the constitution of the embodiment 4.

Further, in the above-described embodiments, only principal portions relating to toner image formation/transfer were described, but the present invention can be carried out in various uses, such as printers, various printing machines, copying machines, facsimile machines, and multi-function machines, by adding necessary devices, equipment, and casing structure.

According to the present invention, it is possible to suppress the occurrence of the improper cleaning while suppressing the blade turning-up.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102279 filed on Jun. 24, 2022, which is hereby incorporated by reference herein in its entirety.

What is claimed is:

1. An image forming apparatus comprising:

an image bearing member;

a developer carrying member configured to carry a developer and to develop a latent image, formed on the image bearing member, into a toner image; and a cleaning member configured to remove the developer from a surface of the image bearing member and including an elastic blade of which free end portion contacts the surface of the image bearing member along a widthwise direction substantially perpendicular to a movement direction of the surface of the image bearing member and a regulating portion configured to regulate a free length of the elastic blade on a base end portion side opposite from the free end portion with respect to a direction crossing the widthwise direction of the elastic blade, wherein at each of opposite end portions with respect to the widthwise direction, an end portion of a developing region which is a region in which the developer carrying member is capable of carrying the developer is positioned outside an end portion of an image forming region in which an image on the image bearing member is capable of being formed, and an end portion of a contact width in which the elastic blade and the image bearing member are in contact with each other is positioned outside the end portion of the developing region, and wherein when an average of a free length L1 [mm] of the elastic blade in the image bearing region in the widthwise direction of the elastic blade is an average free length L1*a* [mm], an average of a free length L2 [mm] of the elastic blade on an outside of the developing region in the widthwise direction of the elastic blade is an average free length L2*a* [mm], and an absolute value of a difference between the average free length L1*a* and the average free length L2*a* is a free length difference ΔL [mm], the following relationships are satisfied:

$$L2a \geq 1.2 \times L1a,$$

$$L2 \geq L2a - \Delta L \times 0.2, \text{ and}$$

$$L1 \leq L1a + \Delta L \times 0.2.$$

2. An image forming apparatus according to claim 1, wherein the following relationship is satisfied:

$$L2 \leq L2a + \Delta L \times 1.3.$$

3. An image forming apparatus according to claim 1, wherein when a free length of the elastic blade on an inside of the developing region with respect to the widthwise direction and on an outside of the image forming region is L3 [mm], the following formula is satisfied:

$$L1a < L3 < L2a.$$

4. An image forming apparatus according to claim 1, wherein with respect to the widthwise direction, an inside end portion of a region in which the free length L2 of the elastic blade in the widthwise direction is substantially uniform is positioned in the same position as or inside the end portion of the developing region and is positioned in the same position as or outside the end portion of the image forming region.

5. An image forming apparatus according to claim 1, wherein with respect to the widthwise direction, an end portion in which the free length L1 of the elastic blade in the widthwise direction is substantially uniform is positioned in the same position as or outside the end portion of the image forming region and is positioned in the same position as or inside the end portion of the developing region.

6. An image forming apparatus according to claim 1, wherein the elastic blade includes a treated portion impregnated with an isocianate compound at the end portion thereof with respect to the widthwise direction, and with respect to the widthwise direction, an inside end portion of the treated portion is positioned outside the end portion of the developing region.

7. An image forming apparatus according to claim 6, wherein the elastic blade has a free length, in a first region corresponding to the image forming region, which is a substantially constant first free length in the widthwise direction, and has a free length, in a second region outside the image forming region, which is a substantially constant second free length longer than the first free length, and wherein an inside end portion of the treated portion is positioned outside an outside end portion of the second region with respect to the widthwise direction.

8. An image forming apparatus according to claim 1, further comprising a contact member which contacts the surface of the image bearing member and to which a voltage is applied, wherein at each of opposite end portions with respect to the widthwise direction, an end portion of a contact region in which the contact member and the image bearing member are in contact with each other is positioned outside the end portion of the developing region, and wherein a free length L12 [mm] of the elastic blade on the outside of the developing region and on an inside of the contact region with respect to the widthwise direction is shorter than a free length L13 [mm] of the elastic blade on an outside of the contact region with respect to the widthwise direction.

9. An image forming apparatus according to claim 8, wherein the free length L12 [mm] has a substantially uniform region, and the free length L13 [mm] has a substantially uniform region.

10. An image forming apparatus according to claim 8, wherein the contact member is a charging member configured to electrically charge the surface of the image bearing member.

11. An image forming apparatus according to claim 8, wherein the contact member is a transfer member configured to transfer an image formed of the developer from the image bearing member onto a recording material.

12. An image forming apparatus according to claim 1, wherein the regulating portion is a supporting member configured to support the elastic blade.

13. An image forming apparatus according to claim 1, further comprising a supporting member configured to support the elastic blade, wherein the regulating portion is a regulating member configured to regulate a surface of the elastic blade on a side opposite from a surface on the image bearing member side by being supported by the supporting member.

14. An image forming apparatus according to claim 1, wherein the image bearing member is a photosensitive member.

15. An image forming apparatus according to claim 1, wherein the image bearing member is an intermediary transfer member configured to feed a toner image, primary-transferred from another image bearing member, for being transferred onto a recording material.

* * * * *